United States Patent [19]

Kusaka

[11] Patent Number: 5,526,088
[45] Date of Patent: Jun. 11, 1996

[54] FOCUS DETECTION DEVICE

[75] Inventor: Yosuke Kusaka, Yokohama, Japan

[73] Assignee: Nikon Corporation, Tokyo, Japan

[21] Appl. No.: 314,459

[22] Filed: Sep. 29, 1994

Related U.S. Application Data

[63] Continuation of Ser. No. 24,771, Mar. 2, 1993, abandoned.

[30] Foreign Application Priority Data

Mar. 5, 1992 [JP] Japan .................................... 4-047408
Mar. 23, 1992 [JP] Japan .................................... 4-065089

[51] Int. Cl.⁶ .................................................. G03B 13/36
[52] U.S. Cl. ........................... 354/402; 354/406; 354/407; 354/432
[58] Field of Search .................... 354/402, 406, 354/407, 414, 429, 430, 432

[56] References Cited

U.S. PATENT DOCUMENTS

| | | | |
|---|---|---|---|
| 4,329,577 | 5/1982 | Asano et al. | 250/201 |
| 4,705,382 | 11/1987 | Mukai et al. | 354/412 |
| 4,719,486 | 1/1988 | Hoshino et al. | 354/408 |
| 4,908,642 | 3/1990 | Komatsuzaki et al. | 354/400 |
| 4,931,822 | 6/1990 | Yamano | 354/402 |
| 4,952,963 | 8/1990 | Akashi | 354/402 |
| 5,128,707 | 7/1992 | Muramatsu | 354/408 |
| 5,218,395 | 6/1993 | Taniguchi et al. | 354/407 |

FOREIGN PATENT DOCUMENTS 1-306809  12/1989  Japan .

Primary Examiner—Russell E. Adams
Attorney, Agent, or Firm—Shapiro and Shapiro

[57] ABSTRACT

A device includes a charge accumulation type image sensor, consisting of a plurality of pixels whose charge accumulation states are simultaneously controlled, for generating an object image signal corresponding to the amount of light received by the pixels, an accumulation control means for controlling the charge accumulation time of the charge accumulation type image sensor, and a focus detection means for executing a focus detection calculation on the basis of the object image signal so as to detect a focus state in a focus detection area set in a frame. When a state requiring flashing of a flashlight is detected, the accumulation control means executes accumulation control placing an importance on a low-luminance portion of an object field by prolonging the charge accumulation time as compared to a state requiring no flashing of the flashlight. Under the charge accumulation control, a focusing operation can be reliably performed even for a low-luminance main object.

61 Claims, 18 Drawing Sheets

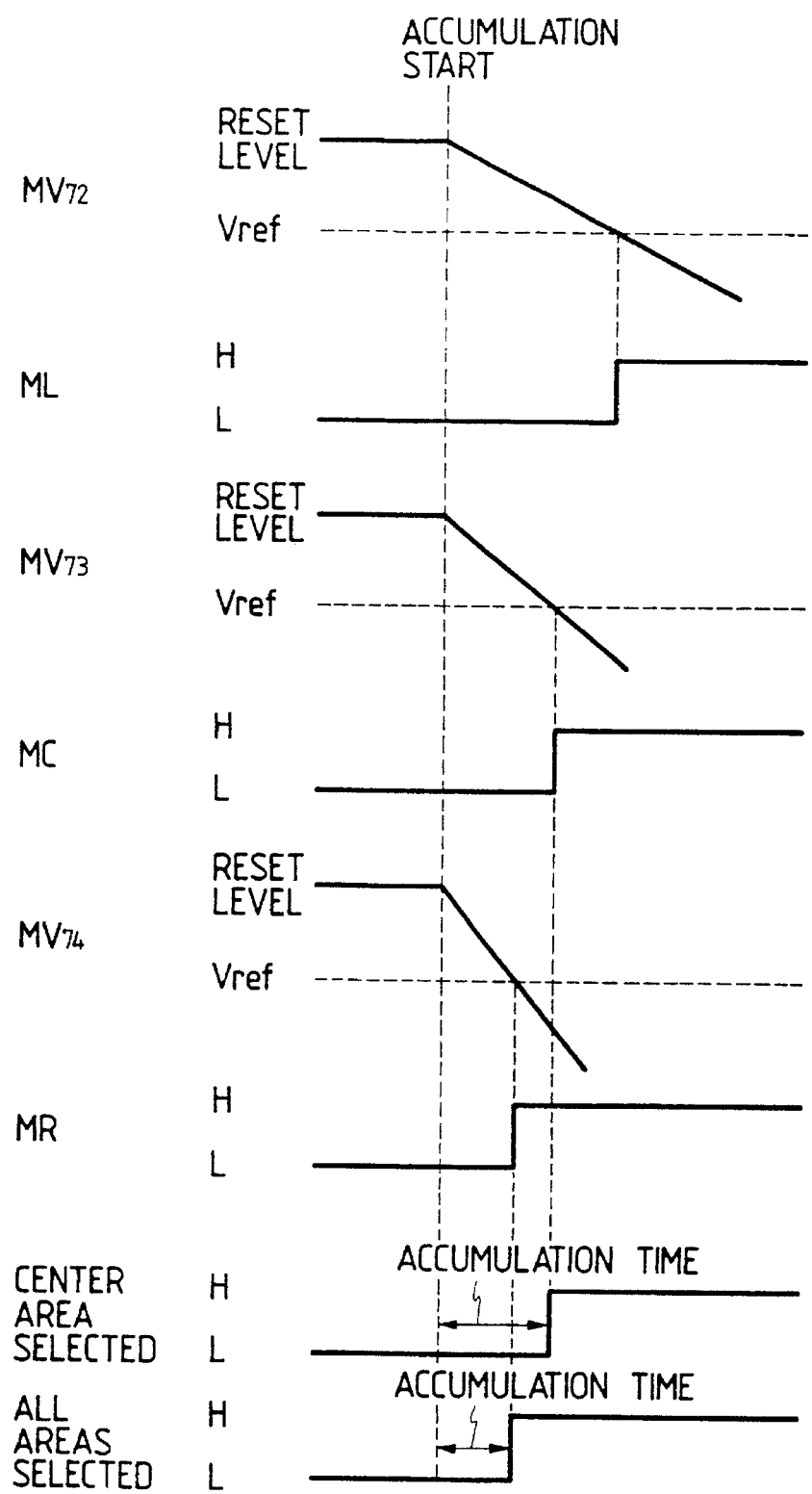

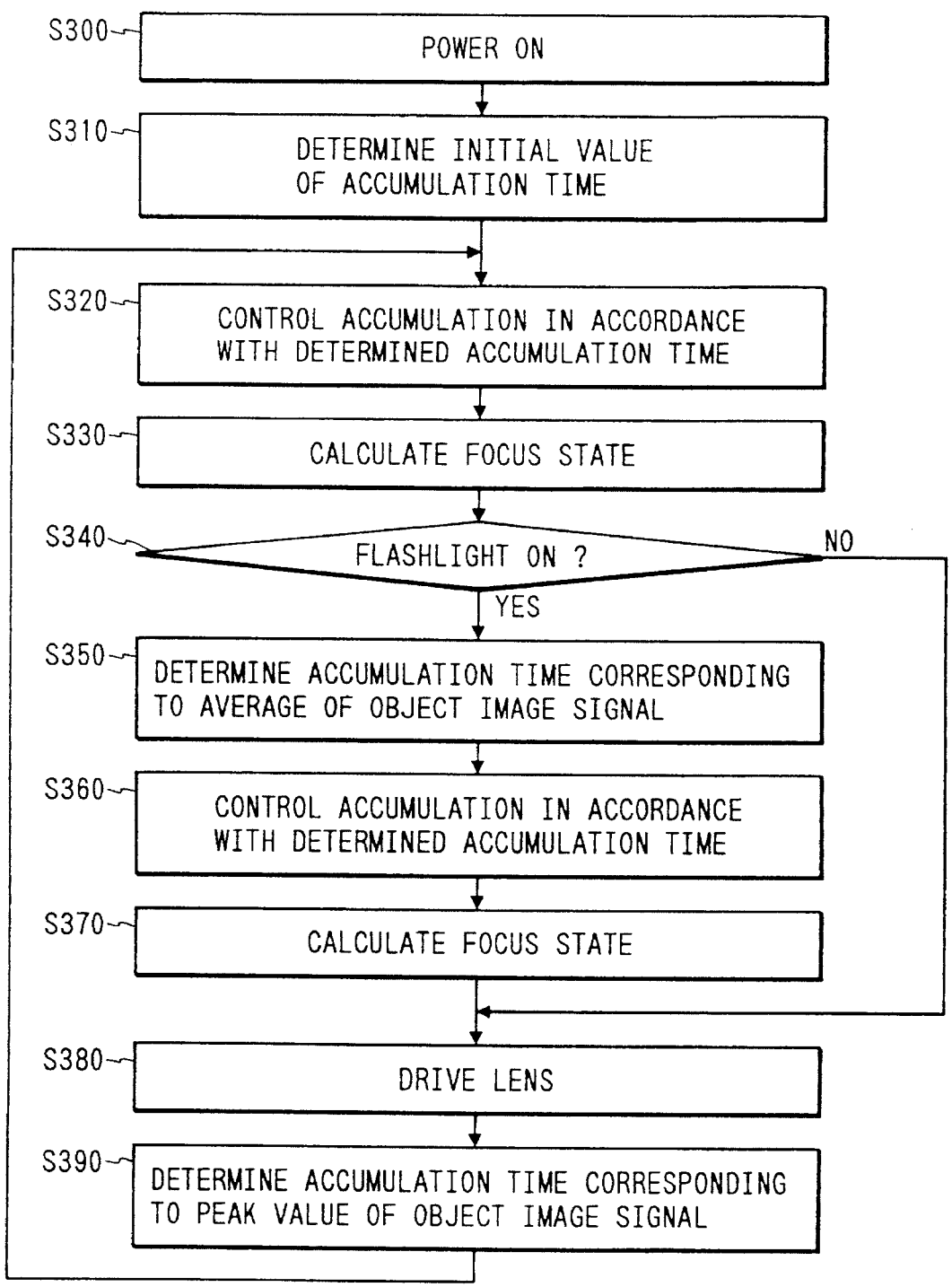

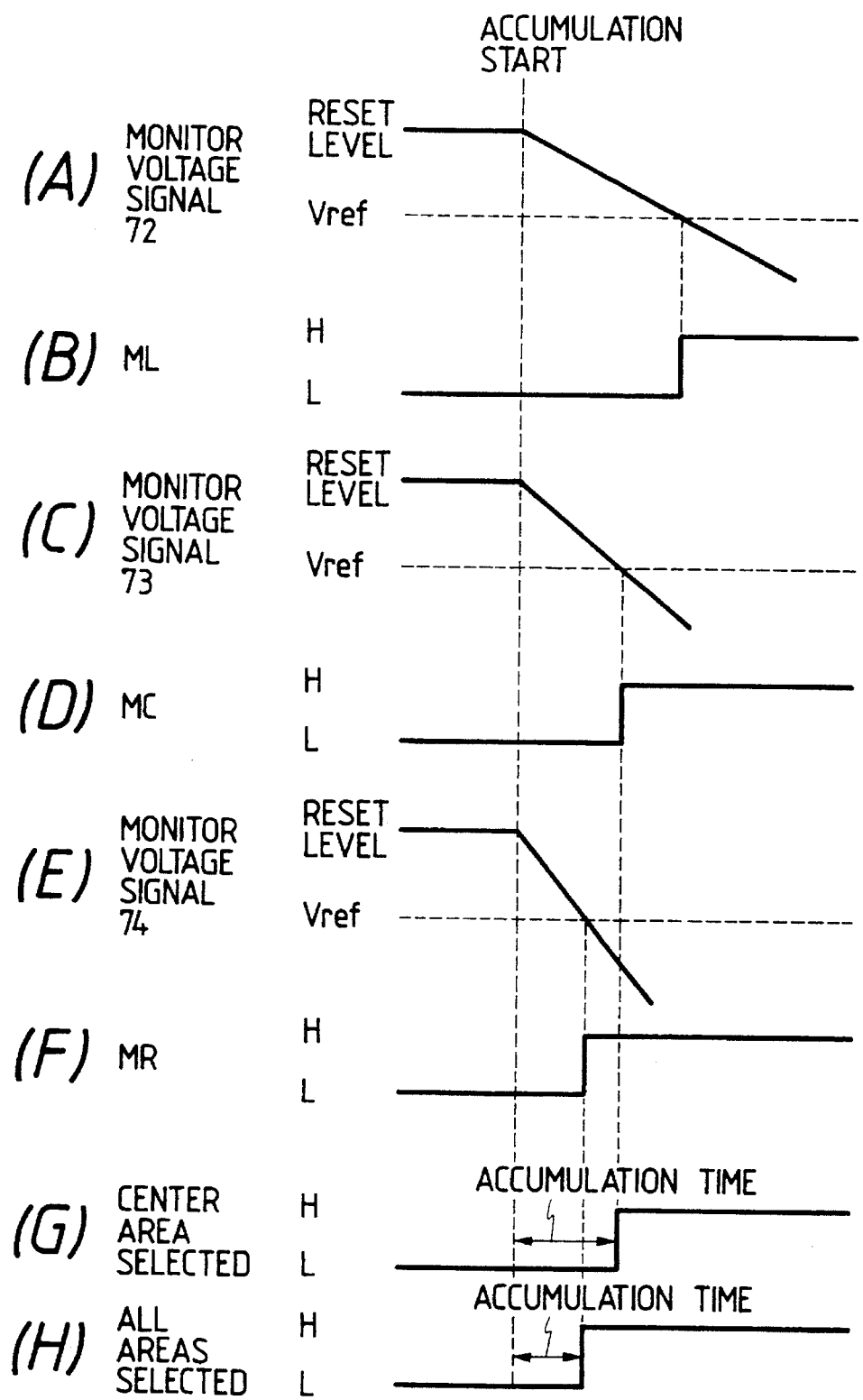

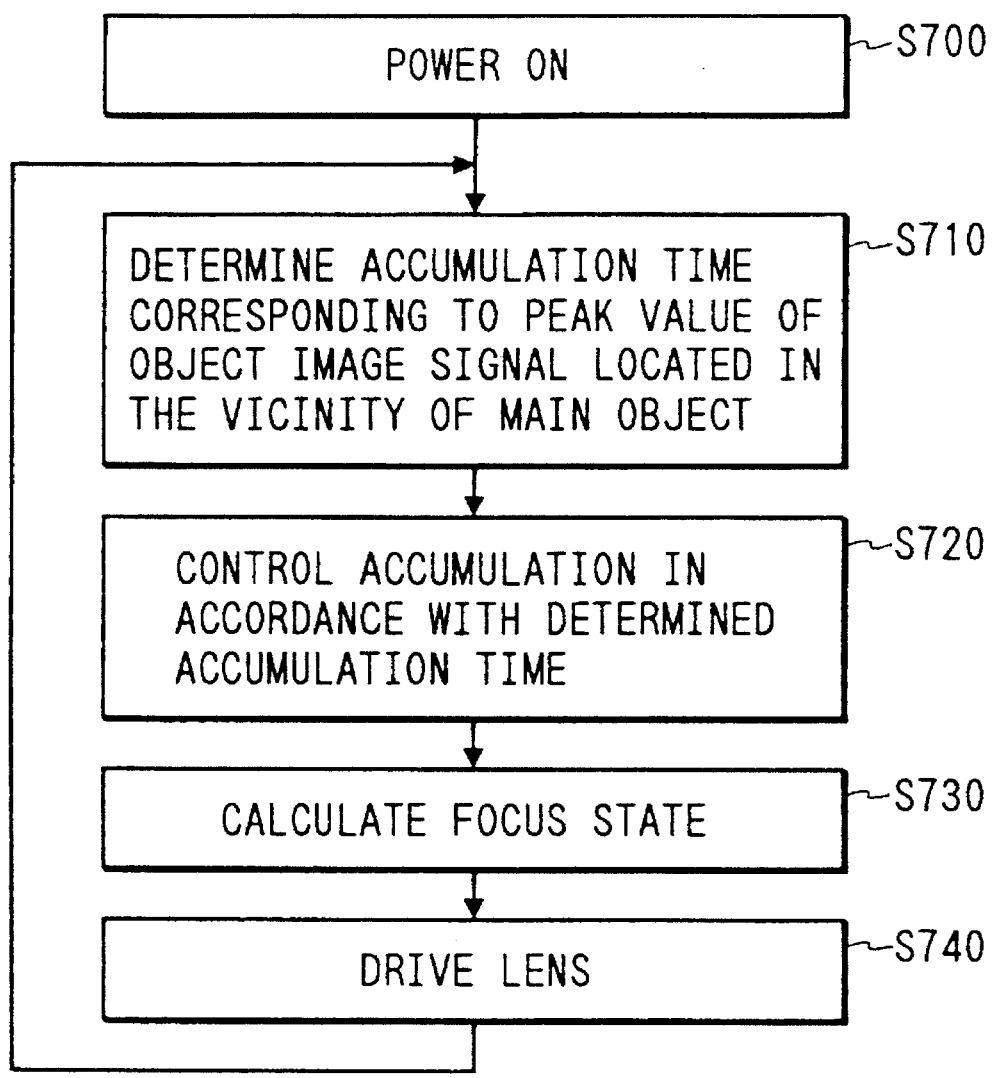

FOCUS DETECTION DEVICE

This is a continuation of patent application Ser. No. 08/024,771 filed Mar. 2, 1993, now abandoned.

BACKGROUND OF THE INVENTION

1. Field of the Invention

The present invention relates to control of the charge accumulation time or charge accumulation area of a focus detection device using a charge accumulation type image sensor.

2. Related Background Art

A focus detection device, which forms an object image on a charge accumulation type image sensor by object light transmitted through a photographing lens, and detects a focus state of the photographing lens on the basis of the object image signal obtained from the image sensor, is known.

In a focus detection device of this type, an object image formed on a focus detection area set on a photographing frame is photoelectrically converted by an image sensor.

When a charge accumulation type image sensor is used, the charge accumulation time must be controlled, so that the obtained object image signal has a level suitable for a focus detection calculation regardless of the luminance of an object. As a method of controlling the charge accumulation time, for example, a method of controlling the accumulation time, so that the peak value of the object image signal has a level value suitable for the focus detection calculation, is known. No problem is posed when focus detection is executed by this control method in a normal photographing situation in which a luminance difference between a main object and a background portion is small.

However, in a situation requiring a flash photographing operation, high-luminance objects such as street lamps, neon signs, and the like are often present as a background portion of a relatively dark main object.

In the conventional focus detection device, when both a main object and a very high-luminance background portion are present within a focus detection area, the charge accumulation time of the charge accumulation type image sensor is controlled, so that an object image signal has a level suitable for the high-luminance background portion. Therefore, an object image signal of the background portion has proper contrast to enable focus detection of the background portion. However, an object image signal of the main object portion becomes a low-level output, and proper contrast cannot be obtained, thus disturbing focus detection.

For this reason, since the focus state for the background portion is detected, and the lens is driven according to the detection result, the background portion is focused, and the main object to be originally focused suffers from an out-of-focus state.

Such a state will be described in detail below.

For example, a case will be examined below wherein a person is located at the center of the frame, and houses are located as a background in a dark state requiring a flash photographing operation, as shown in FIG. 6A. When a focus detection area 51 is set, as shown in FIG. 6B, the accumulation time is controlled, so that an object image signal corresponding to light from window portions of the houses has a predetermined level, as shown in FIG. 7A. As a result, the focus state for light from the windows is detected, and since a central signal portion has a low level, as shown in FIG. 7B, the conventional focus detection device cannot detect the focus state for the person.

The same problem is posed in a photographing operation executed in a rear light condition wherein a brighter background is present behind a main object.

SUMMARY OF THE INVENTION

The present invention has been made to solve the above-mentioned problems, and has as its object to provide a focus detection device which can detect a focus state for a main object in a state requiring a flash photographing operation.

It is another object of the present invention to provide a focus detection device, which can detect a focus state for a main object even when the focus state is detected in a rear light condition.

A focus detection device according to the first aspect of the present invention includes: a charge accumulation type image sensor, consisting of a plurality of pixels whose charge accumulation states are simultaneously controlled, for generating an object image signal according to an amount of light received by the plurality of pixels; accumulation control means for controlling a charge accumulation time of the charge accumulation type image sensor; and focus detection calculation means for executing a focus detection calculation on the basis of the object image signal so as to detect a focus state in a focus detection area set in a frame. When a state requiring flashlight emission is detected, the accumulation control means sets a longer charge accumulation time than that set upon detection of a state requiring no flashlight emission so as to saturate a high-luminance portion of the object image signal, thereby executing accumulation control placing an importance on a low-luminance portion of an object field.

In this device, in a flash photographing state wherein both a main object and a very high-luminance background are present within the focus detection area, since accumulation control of the charge accumulation type image sensor, which control places an importance on a low-luminance portion as compared to a normal photographing state, is executed, the focus state for the main object can be detected, and the device can be prevented from focusing on a high-luminance object as a background object.

A focus detection device according to the second aspect of the present invention includes: a charge accumulation type image sensor, consisting of a plurality of pixels whose charge accumulation states are simultaneously controlled, for generating an object image signal according to an amount of light received by the plurality of pixels; accumulation control means for controlling a charge accumulation time of the charge accumulation type image sensor; and focus detection calculation means for executing a focus detection calculation on the basis of the object image signal so as to detect a focus state in a focus detection area set in a frame. When a rear light condition wherein an object is dark, and the background of the object is bright is detected, the accumulation control means sets a longer charge accumulation time than that set upon detection of a follow light condition wherein an object is bright, thereby executing accumulation control placing an importance on a low-luminance portion of an object field.

In this device, upon detection of a rear light condition wherein both a main object and a very high-luminance background are present within the focus detection area, since accumulation control of the charge accumulation type image sensor, which control places an importance on a low-luminance portion as compared to a follow light condition, is executed, the focus state for the main object in the rear light condition can be detected, and the device can be prevented from focusing on the background.

BRIEF DESCRIPTION OF THE DRAWINGS

FIGS. 4A to 10 show an embodiment according to the first aspect of the present invention, in which FIGS. 4A and 4B are circuit diagrams of a monitor circuit, FIG. 5 is a timing chart showing signals of the monitor circuit, FIG. 8 shows a first example of an operation flow chart, FIG. 9 shows a second example of an operation flow chart, and FIG. 10 shows a third example of an operation flow chart; and FIGS. 11A to 20 show an embodiment according to the second aspect of the present invention, in which FIG. 11A is a circuit diagram of an arrangement of a monitor circuit, FIG. 12 is a timing chart of signals of the monitor circuit, FIG. 16 shows a histogram of the object image signal shown in FIG. 15A, FIG. 17 shows a first example of an operation flow chart, FIG. 18 shows a second example of an operation flow chart, FIG. 19 shows a third example of an operation flow chart, and FIG. 20 shows a fourth example of an operation flow chart.

DETAILED DESCRIPTION OF THE PREFERRED EMBODIMENTS

An embodiment of the present invention will be described hereinafter with reference to the accompanying drawings.

First, a device according to the first aspect of the present invention, i.e., an embodiment of a focus detection device which executes proper charge accumulation control of an image sensor when a flashlight is to flash will be described.

Figure 1:
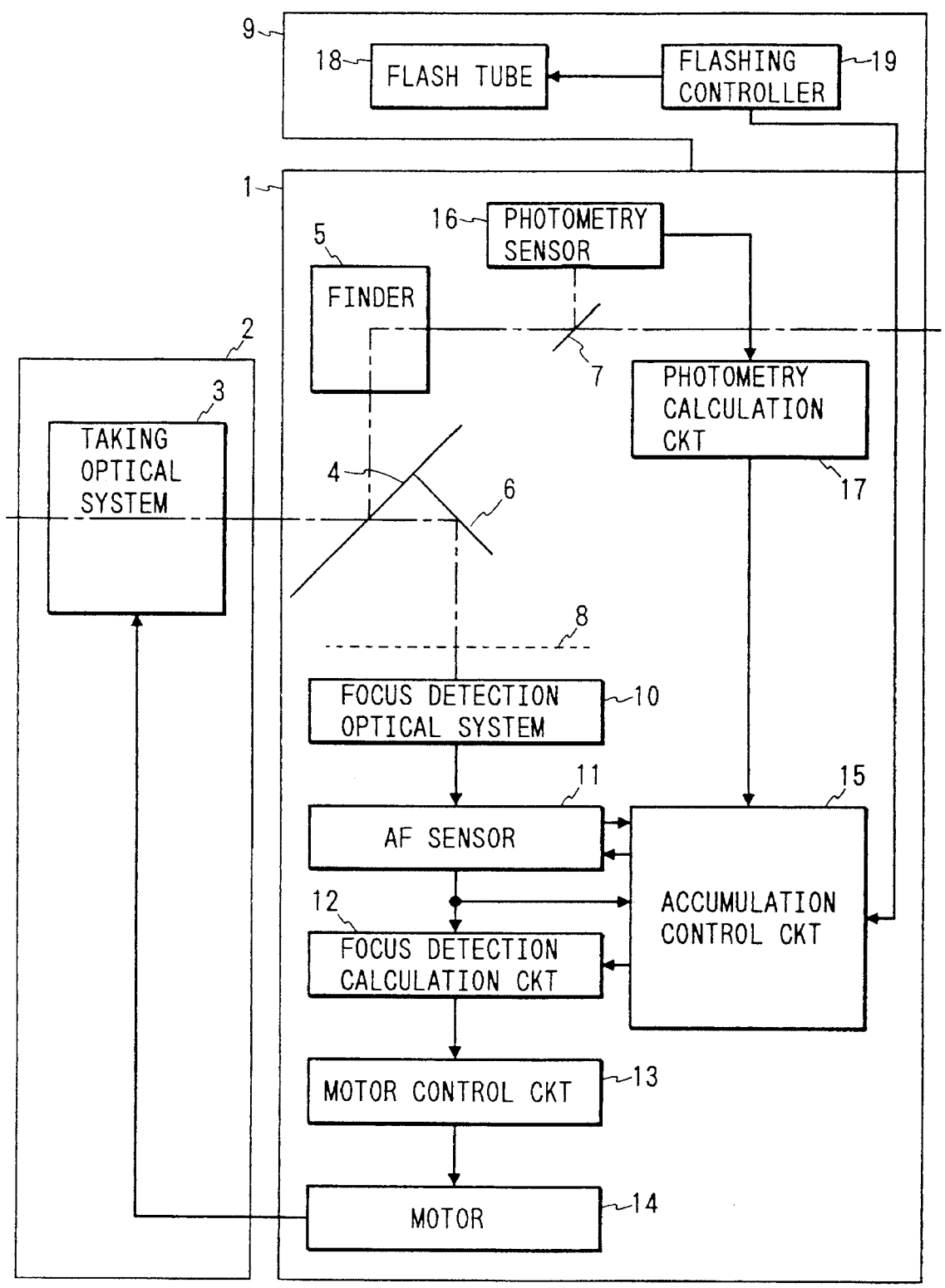
FIG. 1 is a block diagram showing an arrangement according to an embodiment of the present invention.

FIG. 1 is a block diagram showing an embodiment of the present invention. A lens 2 is exchangeably mounted on a camera body 1. FIG. 1 illustrates a state wherein the lens 2 is mounted on the camera body 1.

A light beam reflected by an object and transmitted through a taking optical system 3 is split by a main mirror (half mirror) 4 into two beams in directions of a finder 5 and a sub mirror 6.

A light beam reflected by a half mirror 7 arranged in a finder optical path is guided by an optical system (not shown) toward a photometry sensor 16 for measuring a luminance distribution in a frame. The output from the photometry sensor 16 is used in a photometry calculation by a photometry calculation circuit 17 so as to determine an optimal exposure value with which an object is to be photographed. Note that the photometry sensor 16 covers a wide area including a focus detection area (to be described later) as a photometry area.

A light beam deflected in a direction of the body bottom by the sub mirror 6 is guided toward an auto-focus charge accumulation type image sensor 11 (to be abbreviated to an AF sensor hereinafter) via a focus detection optical system 10, which is arranged near a prospective focal plane 8, conjugate with a film surface, of the taking optical system 3, and will be described later with reference to FIG. 2.

The focus detection optical system 10 and the AF sensor 11 are arranged to be able to detect a focus state on the focus detection area set on the frame.

The AF sensor 11 photoelectrically converts an object image formed thereon, generates an object image signal corresponding to an intensity distribution of the object image, and supplies the object image signal to a focus detection calculation circuit 12.

The focus detection calculation circuit 12 processes the object image signal by a known focus detection calculation, thereby calculating a defocus amount between an image formation plane and the prospective focal plane 8 of the taking optical system 3.

A motor control circuit 13 controls the driving direction and amount of a motor 14 on the basis of the calculated defocus amount.

The motor 14 is mechanically coupled to the taking optical system 3, and moves the taking optical system 3 to a focusing position when its driving amount and speed are controlled.

An accumulation control circuit 15 controls the accumulation time of the AF sensor 11.

A flashlight 9 can be arranged to be detachable from or built in the camera body 1, and a flash tube 18 flashes under the control of a flashing controller 19. The flashlight 9 can be manually or automatically switched between a flash photographing mode for executing a photographing operation together with flashing, and a normal photographing mode for performing a photographing operation without flashing.

The flashing controller 19 supplies photographing mode state information of the flashlight 9 to the accumulation control circuit 15.

<Focus Detection Optical System and AF Sensor>

Figure 2:
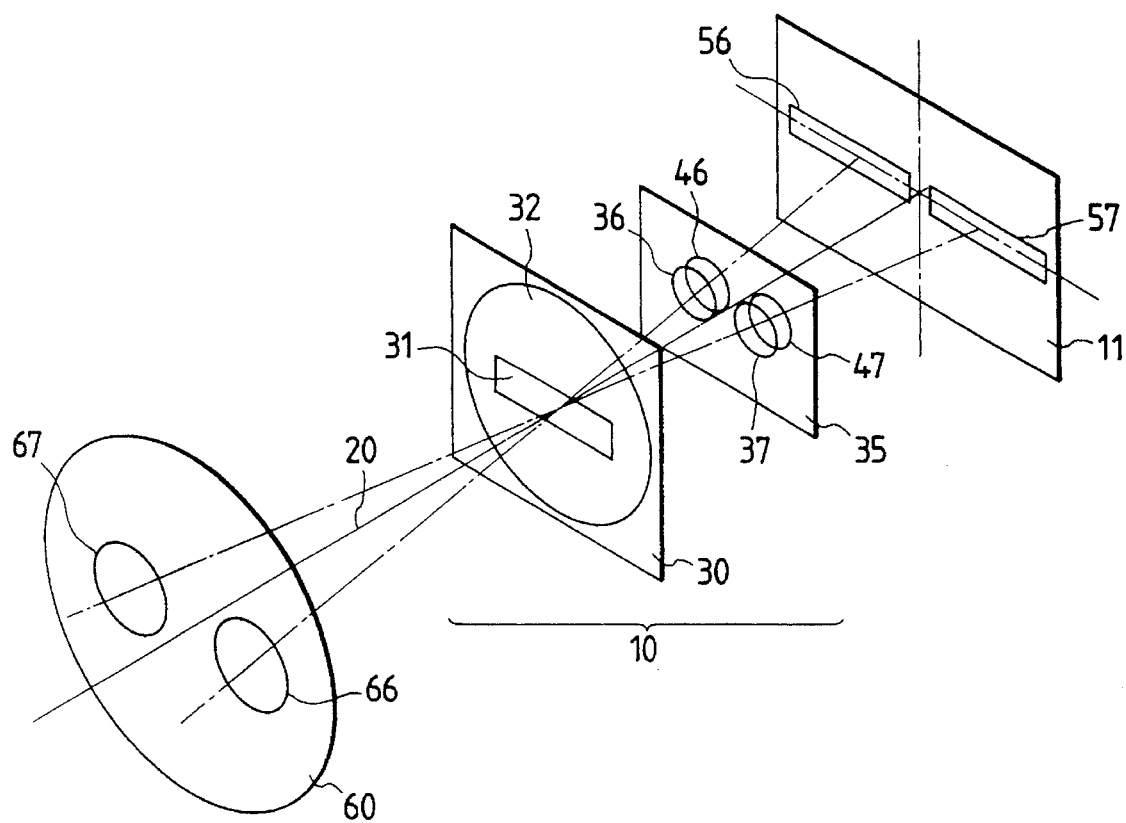
FIG. 2 is an exploded perspective view for explaining a focus detection optical system.

FIG. 2 shows an arrangement of the focus detection optical system 10 and the AF sensor 11.

The focus detection optical system 10 is constituted by a field mask 30 having an opening portion 31, a condenser lens 32, an aperture mask 35 having a pair of aperture stops 36 and 37, and a pair of re-focusing lenses 46 and 47. The optical system 10 re-focuses a primary image formed by the taking optical system 3 as a pair of secondary images on the AF sensor 11 such as CCDs having a pair of light-receiving portions 56 and 57. Each of the light-receiving portions 56 and 57 is constituted by a plurality of pixels, and their accumulation times are simultaneously controlled by the above-mentioned accumulation control circuit 15.

Figure 3:
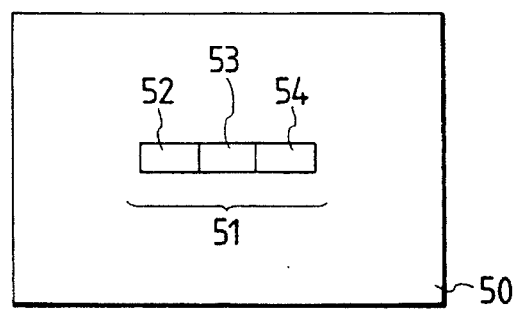
FIG. 3 is a plan view for explaining a focus detection area.

The opening portion 31 of the field mask 30 is arranged near the prospective focal plane 8 on a photographing optical axis 20, and the shape of the opening portion 31 defines a focus detection area 51 on a frame 50, as shown in FIG. 3.

In the above arrangement, the pair of aperture stops 36 and 37 are conjugate with a pair of areas 66 and 67, symmetrical about the optical axis 20, of a plane 60 near an exit pupil of the taking optical system 3 by the condenser lens 32. A light beam passing through these areas form a primary image near the field mask 30. The primary image formed in the opening portion 31 of the field mask 30 is then transmitted through the condenser lens 32, and the pair of aperture stops 36 and 37, and is formed as a pair of secondary images on the pair of light-receiving portions 56 and 57 by the pair of re-focusing lenses 46 and 47.

The intensity distributions of the pair of secondary images are photoelectrically converted by the light-receiving portions 56 and 57, thus obtaining electrical object image signals.

When the relative positional relationship, in the alignment direction of the pair of light-receiving portions, of the pair of secondary images formed on the AF sensor 11 is detected on the basis of the object image signals generated by the AF sensor 11, the defocus amount of the taking optical system 3 can be detected by a known method.

<Focus Detection Calculation Circuit>

The focus detection calculation circuit 12 divides each of the pair of object image signals into three blocks, and executes known focus detection correlation calculation processing for each block. Then, the circuit 12 detects the relative positional relationship, in the alignment direction of the pair of light-receiving portions, of the pair of secondary images formed on the AF sensor 11, thereby obtaining focus states on three blocks 52, 53, and 54 of the focus detection area 51 on the frame 50 shown in FIG. 3.

The above-mentioned arrangements are common to all embodiments of the present invention to be described later.

<Accumulation Control Operation>

Figure 4A:
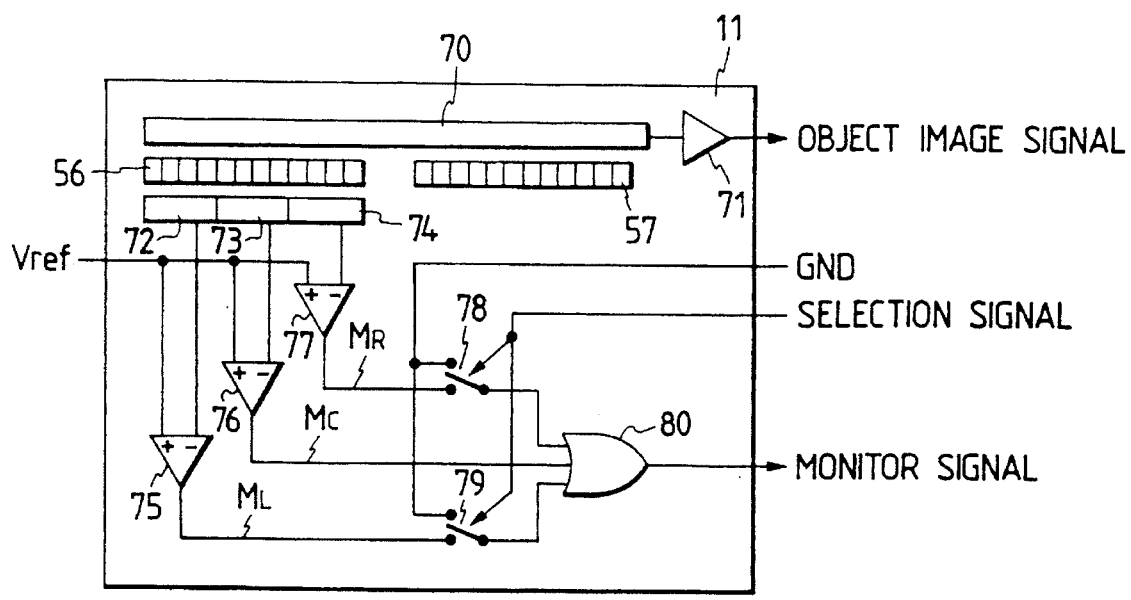

The accumulation control circuit 15 controls the accumulation time using one of (1) a method of determining an accumulation time using signals from monitor portions 72, 73, and 74, (2) a method of determining an accumulation time using an object image signal obtained in an immediately preceding accumulation operation, and (3) a method of determining an accumulation time using a photometry calculation value. The three methods will be described below.
(1) Method Using Monitor Signals FIG. 4A shows an arrangement of the AF sensor 11 having a monitor circuit for controlling the accumulation time.

The plurality of pixels constituting each of the pair of light-receiving portions 56 and 57 start charge accumulation in response to an accumulation start signal from the accumulation control circuit 15.

The accumulated charges are transferred to a shift register 70 in response to an accumulation end signal, are amplified by an amplifier 71, and are then output as object image signals.

The monitor portions 72, 73, and 74 arranged near the light-receiving portion 56 are means for detecting average levels of the intensities of object image portions respectively formed on the left, central, and right areas of the light-receiving portion 56. These monitor portions 72, 73, and 74 start charge accumulation in response to the accumulation start signal, and generate monitor voltage signals ($MV_{72}$, $MV_{73}$, and $MV_{74}$ in FIG. 5) corresponding to the accumulated charge amounts.

The monitor voltage signals and a reference voltage Vref are input to comparators 75, 76, and 77, and are compared with each other. Outputs ML, MC, and MR from the comparators 75, 76, and 77 are inverted from L (Low) level to H (High) level when the corresponding monitor voltage signal becomes equal to or lower than Vref.

The outputs ML and MR and a signal GND are input to an OR gate 80 via switches 78 and 79 which are controlled by a selection signal, and the output MC is directly input to the OR gate 80. The accumulation control circuit 15 controls to output the accumulation end signal to the light-receiving portions 56 and 57 upon detection of rising from L level to H level of a monitor signal as an output from the OR gate 80.

The monitor voltage signals $MV_{72}$, $MV_{73}$, and $MV_{74}$, and the outputs ML, MC, and MR will be described below with reference to FIG. 5.

Each monitor voltage signal is reset to a reset level before accumulation is started, and its voltage is gradually decreased according to the accumulated charge amount after accumulation is started. The rate of decrease in voltage is determined according to the luminance of an object image. When the object image is dark, the rate is small; otherwise, the rate is large.

Each of the monitor voltage signals $MV_{72}$, $MV_{73}$, and $MV_{74}$ is compared with the reference voltage Vref by the corresponding comparator, and when the monitor voltage signal becomes equal to or lower than Vref, a corresponding one of the outputs ML, MC, and MR from the comparators 75, 76, and 77 is inverted from L level to H level.

The time intervals from the beginning of accumulation until inversion of the corresponding comparator outputs are determined as accumulation times in which the pixel outputs from the left, central, and right areas of the light-receiving portion 56 corresponding to the monitor portions 72, 73, and 74 respectively have proper levels.

The accumulation control circuit 15 can select whether to optimize the pixel output level in correspondence with the central block 53 of the focus detection area, with the brightest one of the three blocks of the focus detection area, or the like, in accordance with the selection signal. In general, since a main object is highly possibly present at the center of the frame, the monitor area is limited to only the central area, so that an object image signal can have a proper level for the main object without being adversely affected by a bright object present in the background.

Therefore, when the flash photographing mode is selected, the monitor area is limited to only the central area, so that an object image signal can have a proper level for the main object.

The accumulation control circuit 15 can execute accumulation control placing an importance on a bright portion of an object image by increasing the reference voltage Vref, and can execute accumulation control placing an importance on a dark portion of an object image by decreasing the reference voltage Vref.

Figure 4B:
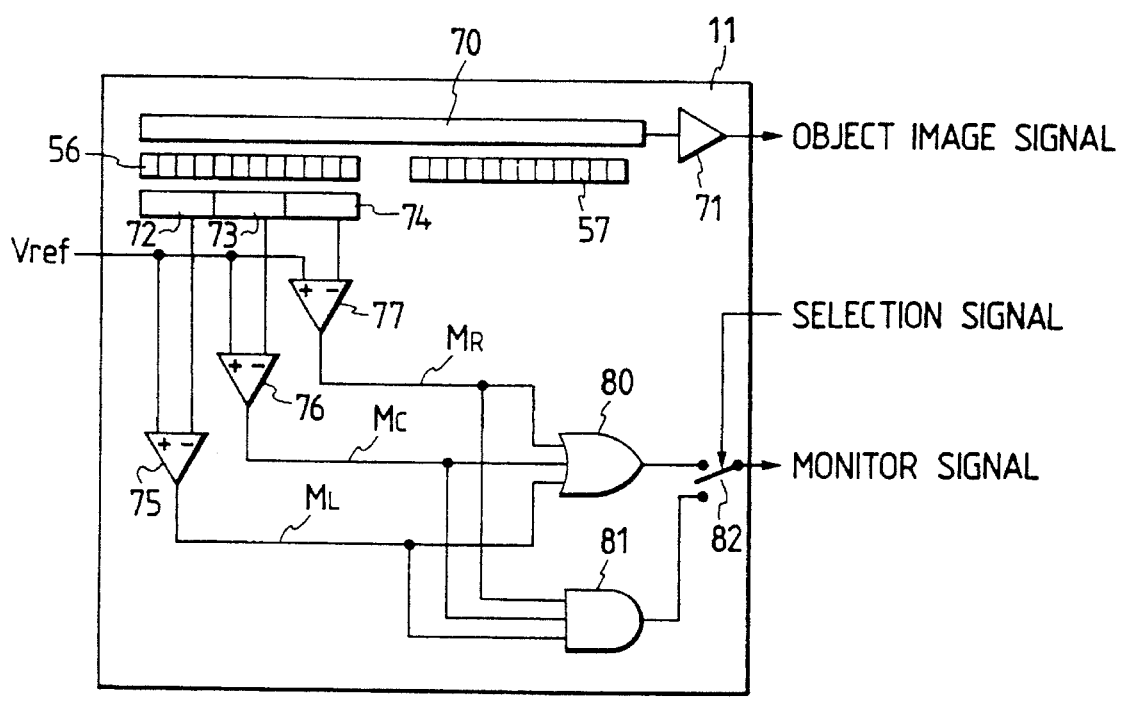

As shown in FIG. 4B, the switches 78 and 79 may be omitted, so that the outputs ML and MR are always input to the OR gate 80. In addition, the outputs ML, MC, and MR may be input to an AND gate 81, and which of the outputs from the AND gate 81 and the OR gate 80 is used as a monitor signal may be switched by a switch 82 in response to a selection signal.

For example, when an importance is placed on a low-luminance object, the output from the AND gate 81 can be used as a monitor signal; in a normal state, the output from the OR gate 80 can be used as a monitor signal.

Figure 8:
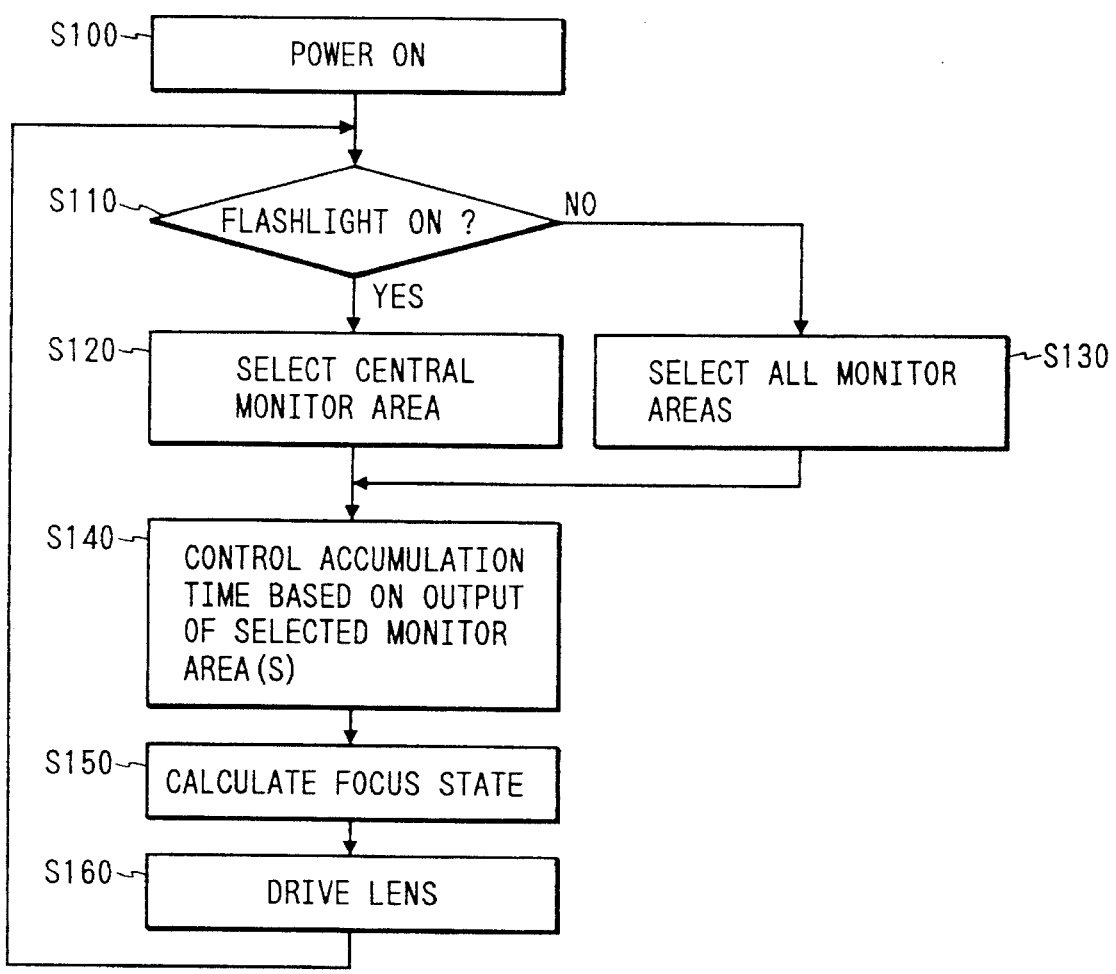

FIG. 8 shows a first example of an operation flow chart of the device of this embodiment. In this example, the accumulation control circuit 15 controls the accumulation time of the AF sensor 11 using the monitor signals.

A case will be described first wherein the AF sensor 11 having the arrangement shown in FIG. 4A is used.

In step 100, a power supply is turned on, and the flow advances to step 110.

In step 110, the accumulation control circuit 15 receives the photographing mode state information from the flashing controller 19 to check if the flashlight 9 is ON (whether or not the flashlight flashes in a photographing operation). If Y (YES) in step 110, step i.e., if the flash photographing mode is selected, the accumulation control circuit 15 sets the selection signal to select the monitor portion 73, and properly controls the pixel output level in correspondence with the central block 53 of the focus detection area (step 120).

However, if N (NO) in step 110, i.e., if the normal photographing mode is selected, the accumulation control circuit 15 sets the selection signal to select the monitor portions 72, 73, and 74, and properly controls the pixel output level in correspondence with the entire focus detection area (step 130).

In step 140, the accumulation control circuit 15 controls the accumulation time of the AF sensor 11 using the selected monitor portion(s).

In step 150, the focus detection calculation circuit 12 processes object image signals read from the AF sensor 11, and calculates a defocus amount of the taking optical system 3.

In step 160, the motor control circuit 13 drives the motor 14 to move the taking optical system 3 to an in-focus position on the basis of the calculated defocus amount. The flow then returns to step 110 to repeat the above-mentioned operation.

With the above-mentioned operation, in the flash photographing mode, the monitor area of the focus detection area is automatically limited from the entire area to the central area. In general, since a main object is highly possibly present at the center of the frame, the monitor area is limited to only the central area, so that an object image signal can have a proper level for the main object without being adversely affected by a bright object present in the background.

In step 150, the focus detection calculation circuit 12 may always calculate a focus state on the basis of the entire focus detection area, or may calculate a focus state on the basis of the central block of the focus detection area in correspondence with the selected monitor area in the flash photographing mode.

The operations in steps 120, 130, and 140 may be modified as follows.

In step 120, i.e., when the flash photographing mode is selected, the accumulation control circuit 15 sets the selection signal to select the monitor portions 72, 73, and 74 to properly control the pixel output level in correspondence with the entire focus detection area, and sets the reference voltage Vref to be lower than a normal voltage.

In step 130, i.e., when the normal photographing mode is selected, the accumulation control circuit 15 sets the selection signal to select the monitor portions 72, 73, and 74 to properly control the pixel output level in correspondence with the entire focus detection area, and sets the reference voltage Vref to be a normal voltage.

In step 140, the accumulation control circuit 15 controls the accumulation time of the AF sensor 11 using the monitor portions 72, 73, and 74 on the basis of the reference voltage set in step 120 or 130.

With this operation, when the flash photographing mode is selected, the reference voltage Vref is automatically decreased, and the accumulation time is prolonged as compared to that in the normal photographing mode. Thus, even when a low-luminance main object is to be photographed in the flash photographing mode, an object image signal of the main object portion can be controlled to have a proper level without being adversely affected by a bright object in the background.

A case will be described below wherein the AF sensor 11 having the arrangement shown in FIG. 4B is used.

In this case, the operations in steps 120, 130, and 140 are modified as follows.

In step 120, i.e., when the flash photographing mode is selected, since the accumulation control circuit 15 sets the selection signal to select the output from the AND gate 81, it executes control on the basis of the latest one of the monitor outputs ML, MC, and MR from the monitor portions 72, 73, and 74.

In step 130, i.e., when the normal photographing mode is selected, since the accumulation control circuit 15 sets the selection signal to select the output from the OR gate 80, it executes control on the basis of the earliest one of the monitor outputs ML, MC, and MR from the monitor portions 72, 73, and 74.

In step 140, the accumulation control circuit 15 controls the accumulation time of the AF sensor 11 using the selected monitor signal.

With this operation, in the flash photographing mode, since the latest one of the monitor outputs ML, MC, and MR is selected, the accumulation time is optimized in correspondence with a dark portion of an object. Thus, even when a low-luminance main object is to be photographed in the flash photographing mode, an object image signal of the main object portion can be controlled to have a proper level without being adversely affected by a bright object in a background.

(2) Method Using Object Image Signal Obtained in Immediately Preceding Accumulation Operation (2)-1 When accumulation time is determined using "peak value of object image signal"

Figure 7A:
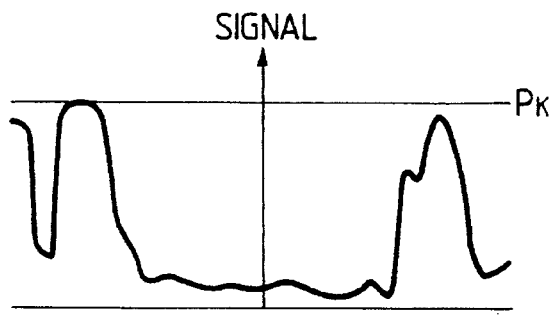
FIGS. 7A to 7D are charts for explaining an object image signal.

In this method, the AF sensor 11 starts charge accumulation in response to the accumulation start signal from the accumulation control circuit 15, the charge accumulation of the AF sensor 11 is ended when the peak value of object image signals from the pixels of the sensor 11 reaches a predetermined value, and a focus state is detected on the basis of the object image signal obtained at the end of accumulation. For example, the charge accumulation of the AF sensor 11 is ended when the peak value of an object image signal from a certain pixel reaches a predetermined value Pk, as shown in FIG. 7A.

When the accumulation time in the immediately preceding accumulation operation is represented by Tp, the peak value of an object image signal is represented by Pp, and the predetermined value is represented by Pk, an accumulation time Tq to be currently controlled is determined by the following equation 1.

$$Tq = Tp \times Pk/Pp \qquad \text{EQUATION 1}$$

A peak value Pq of an object image signal currently accumulated for the accumulation time Tq has the same value as the predetermined value Pk.

When the object image signal is used in this manner, the mode switching operation described in the method (1) may be performed as well. More specifically, a control mode may be switched between the entire mode for extracting the peak value Pp from object image signals corresponding to the entire focus detection area 51 shown in FIG. 3 and the center mode for extracting the peak value Pp from the central area 53 of the focus detection area according to a situation.

Figure 6A:
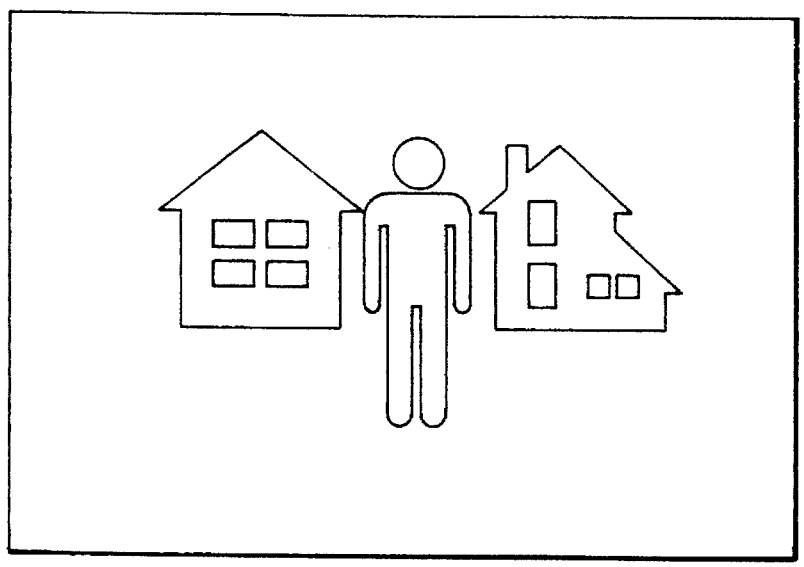
FIGS. 6A and 6B are views showing an object.
Figure 6B:
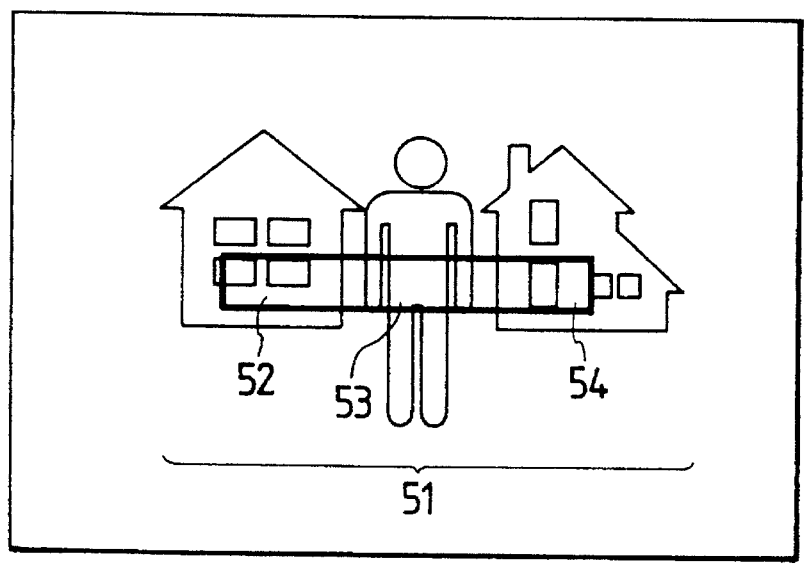

In this case, when the entire mode is selected in a situation shown in, e.g., FIG. 6B, an object image signal shown in FIG. 7A is obtained as a result of processing, and a peak value corresponding to light from the window portion of a house is extracted as the predetermined value Pk.

Figure 7B:
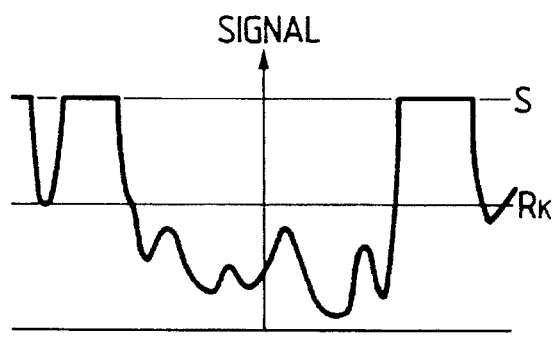
Figure 7C:
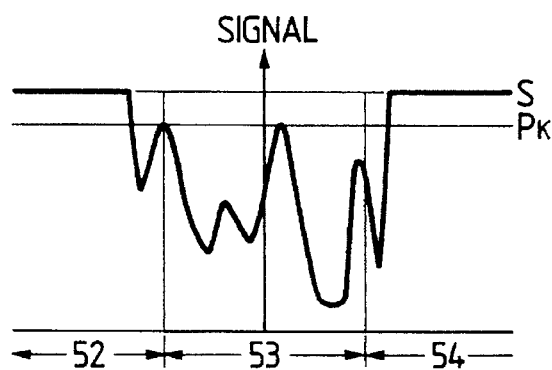

When the center mode is selected in the same situation, an object image signal shown in FIG. 7C is obtained as a result of processing, and a peak value corresponding to a person portion is extracted as the predetermined value Pk. In this case, a bright portion is clipped at a saturation level S of a signal. In this manner, an object image signal can be controlled to have a proper level for a main object without being adversely affected by a bright object in the background.

Even when the entire mode is fixed in place of performing a mode switching operation, the accumulation control circuit 15 can execute accumulation control placing an importance on a dark portion of an object image by changing the predetermined value Pk to be a higher value.

Equation 1 may be applied to each of three-divided blocks, as shown in FIG. 3, so as to calculate optimal accumulation times of the three blocks, and when an importance is to be placed on a dark portion, the longest accumulation time may be employed.

(2)-2 When accumulation time is determined using average value of object image signal In this method, the AF sensor 11 starts charge accumulation in response to the accumulation start signal from the accumulation control circuit 15, the charge accumulation of the AF sensor 11 is ended when an average value of object image signals from the pixels of the sensor 11 reaches a predetermined value, and a focus state is detected based on the object image signal at the end of accumulation. For example, when an average value of an object image signal from a certain pixel reaches a predetermined value Rk, as shown in FIG. 7B, the charge accumulation of the sensor 11 is ended.

When the accumulation time in the immediately preceding accumulation operation is represented by Tp, the average value of an object image signal is represented by Rp, and a predetermined value is represented by Rk, an accumulation time Tq to be currently controlled is determined by the following equation 2.

$$Tq = Tp \times Rk/Rp \qquad \text{EQUATION 2}$$

The average value Rq of an object image signal currently accumulated for this accumulation time has the same value as the predetermined value Rk.

In the normal photographing mode, the peak value of an object image signal may be used as the predetermined value for determining the accumulation time, and in the flash photographing mode, the average value of an object image signal may be used as the predetermined value, so that an object image signal of a dark main object can be controlled to have a proper level.

For example, assume that the entire mode is selected in a situation shown in FIG. 6B, and the predetermined values Pk and Rk are equal to each other. An object image signal obtained in the normal photographing mode is as shown in FIG. 7A, and an object image signal obtained in the flash photographing mode is as shown in FIG. 7B. In the method of controlling the accumulation time based on the average value, the level of an object image signal corresponding to a dark person portion is increased as compared to the method of controlling the accumulation time based on the peak value. In this method, a bright portion is clipped at the saturation level S of the signal. For this reason, an object image signal having a proper level for a person can be obtained.

In this case, the mode switching operation may also be performed as in the description of the method (1).

More specifically, a control mode may be switched between the entire mode for obtaining the average value Rp from object image signals corresponding to the entire focus detection area 51 shown in FIG. 3 and the center mode for extracting the average value Rp from the central area 53 of the focus detection area shown in FIG. 3.

When the center mode is selected in a certain situation, the average value of a person portion of an object image signal obtained as a result of processing has the predetermined value Pk. For this reason, the level of the object image signal corresponding to the person portion can become larger than that obtained when the entire mode is selected.

In the entire mode, the accumulation control circuit 15 may change the predetermined value Rk to be a higher value, or may calculate optimal accumulation times in units of blocks by applying equation 2 to each of three-divided blocks, as shown in FIG. 3, as in the description of the method (2)-1.

Figure 7D:
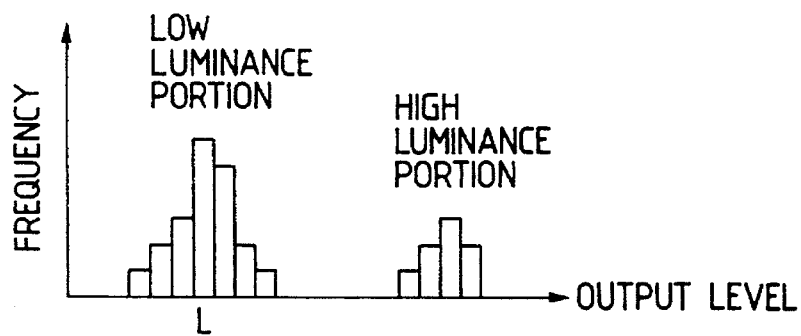

(2)-3 When high-luminance distribution portion of object image signal is excluded FIG. 7D shows a histogram in which the output level divisions of all object image signals shown in FIG. 7A are plotted along the abscissa, and frequencies included in corresponding output level divisions are plotted along the ordinate. The output levels are preferably divided to 20 to 30 divisions in consideration of calculation processing capacity.

When a distribution is clearly separated into high- and low-luminance portions like in this histogram, the level indicating the maximum frequency in the low-level distribution portion excluding the high-level distribution portion is represented by L, the accumulation time in the immediately preceding accumulation operation is represented by Tp, and a predetermined value is represented by Rk. In this case, an accumulation time Tq to be currently controlled is determined by the following equation 3.

$$Tq = Tp \times Rk/L \qquad \text{EQUATION 3}$$

An average value Rq of an object image signal currently accumulated for this accumulation time has the same value as the predetermined value Rk.

Note that a separated distribution of a histogram means a histogram in which when the frequency of a certain output level is 0, output levels each having a frequency of 1 or more are present at positions higher and lower than the output level.

(3) Method Using Photometry Calculation Value

Since the object luminance is inversely proportional to the accumulation time, when a coefficient of proportion is represented by K, and an optimal exposure value calculated by the photometry calculation circuit 17 is represented by E (calculated as an EV value), an accumulation time Tq to be currently controlled can be determined by the following equation 4.

$$Tq=K/2^E \qquad \text{EQUATION 4}$$

In general, since the photometry sensor 16 detects an average luminance of an object, even when a high-luminance portion is locally present, the sensor 16 ignores this portion, and generates an output corresponding to an average luminance level. The photometry calculation circuit 17 calculates an optimal exposure value on the basis of this output.

The accumulation control circuit 15 can execute accumulation control placing an importance on a dark portion of an object image by controlling the accumulation time according to the photometry calculation value as in equation 4.

Therefore, in the normal photographing mode, the accumulation time can be controlled using the peak value of an object image signal, and when the flash photographing mode is selected, the accumulation time can be determined on the basis of the photometry calculation value, so that an object image signal of a dark person portion can be controlled to have a proper level.

When the photometry sensor executes a photometry operation using multiple-divided photographing frames, the accumulation time is determined based on a photometry calculation value obtained by using all the photometry areas in the normal photographing mode. On the other hand, when the flash photographing mode is selected, the photometry calculation circuit 17 discriminates from a plurality of photometry sensor outputs that a high-luminance portion is locally present, and calculates an optimal exposure value for a main object while automatically ignoring this portion. Then, the accumulation time is determined based on a photometry calculation value obtained using the remaining areas, so that an object image signal of a dark person portion can be controlled to have a proper level.

Figure 9:
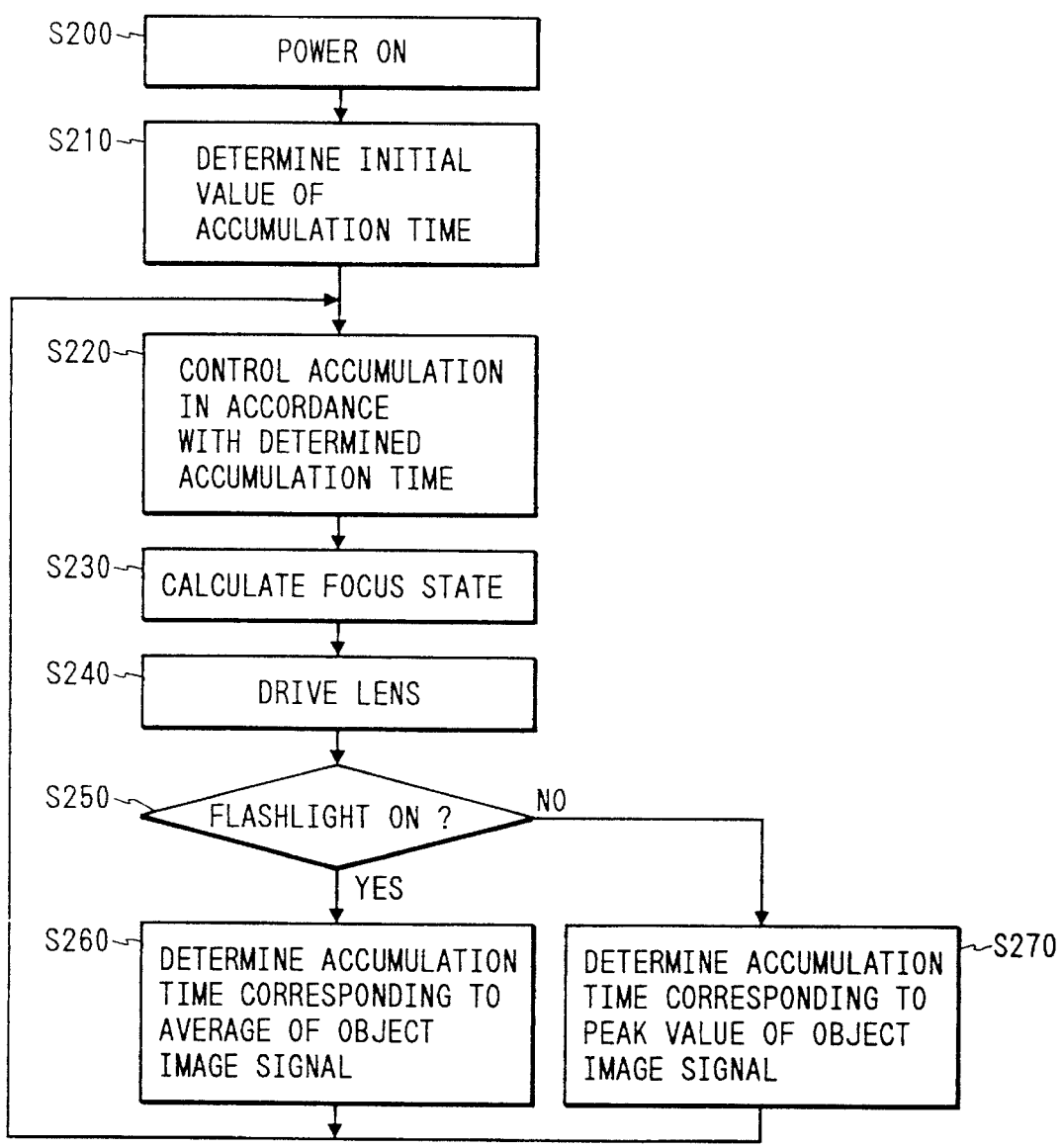

FIG. 9 shows a second example of an operation flow chart of the device of this embodiment. In this example, the accumulation control circuit 15 controls the current accumulation time of the AF sensor 11 using an object image signal obtained in the immediately preceding accumulation operation.

In step 200, a power supply is turned on, and the flow advances to step 210.

In step 210, the accumulation control circuit 15 sets an initial value of the accumulation time since there is no previous object image signal immediately after the power supply is turned on.

In step 220, the accumulation control circuit 15 controls charge accumulation of the AF sensor 11 according to the set accumulation time.

In step 230, the focus detection calculation circuit 12 processes object image signals read from the AF sensor 11, and calculates a defocus amount of the taking optical system 3.

In step 240, the motor control circuit 13 drives the motor 14 to move the taking optical system 3 to an in-focus position on the basis of the calculated defocus amount.

In step 250, the accumulation control circuit 15 receives photographing mode state information from the flashing controller 19 to check if the flashlight 9 is ON. If Y in step 250, the flow advances to step 260; otherwise, the flow advances to step 270.

In step 260, i.e., if the flash photographing mode is selected, the accumulation control circuit 15 determines the next accumulation time on the basis of equation 2, so that the average value of an object image signal has the predetermined value. Thereafter, the flow returns to step 220.

In step 270, i.e., if the normal photographing mode is selected, the accumulation control circuit 15 determines the next accumulation time on the basis of equation 1, so that the peak value of an object image signal has the predetermined value. Thereafter, the flow returns to step 220.

With the above-mentioned operation, since the accumulation time is determined using the peak value of an object image signal in the normal photographing mode, a bright portion of an object image signal is optimized to have a proper level. On the other hand, since the accumulation time is determined using the average value of an object image signal in the flash photographing mode, an object image signal of a relatively dark main object portion can be controlled to have a proper level without being adversely influenced by a bright object in the background.

In step 260, in place of determining the accumulation time, so that the average value has the predetermined value, the accumulation time may be determined according to equation 3, so that the level having the maximum frequency has the predetermined value, or the accumulation time may be determined on the basis of an optimal exposure calculation value according to equation 4.

The operations in steps 260 and 270 may be modified as follows.

In step 260, i.e., if the flash photographing mode is selected, the accumulation control circuit 15 determines the next accumulation time based on equation 2, so that the average value of an object image signal has a predetermined value k0. The flow then returns to step 220. Note that the predetermined value k0<a predetermined value k1. In step 270, i.e., if the normal photographing mode is selected, the accumulation control circuit 15 determines the next accumulation time based on equation 2, so that the average value of an object image signal has a predetermined value k1. Thereafter, the flow returns to step 220.

With this operation, since the accumulation time is determined so that the average value of an object image signal in the flash photographing mode becomes higher than that in the normal photographing mode, an object image signal of a relatively dark main object portion can be controlled to have a proper level without being adversely affected by a bright object in the background. In the above operation, a peak value may be used in place of the average value.

The operations in steps 260 and 270 may also be modified as follows.

In step 260, i.e., if the flash photographing mode is selected, the accumulation control circuit 15 determines the next accumulation time based on equation 1, so that the peak value of an object image signal from the central area has the predetermined value. The flow then returns to step 220.

In step 270, i.e., if the normal photographing mode is selected, the accumulation control circuit 15 determines the next accumulation time based on equation 1, so that the peak value of object image signals from all the areas has the predetermined value. Thereafter, the flow returns to step 220.

With the above-mentioned operation, in the flash photographing mode, an area of an object image to be used in determination of the accumulation time is automatically narrowed from all the areas to the central area. In general, since a main object is highly possibly present at the center of the frame, the monitor area is limited to only the central area, so that an object image signal can have a proper level for the main object without being adversely affected by a bright object present in the background. In the above operation, an average value may be used in place of the peak value.

In step 230, the focus detection calculation circuit 12 may always detect a focus state using the entire focus detection area, but may detect a focus state using only the central portion of the focus detection area in the flash photographing mode.

The operations in steps 260 and 270 may also be modified as follows.

In step 260, i.e., if the flash photographing mode is selected, the accumulation control circuit 15 divides an object image signal into portions corresponding to the three blocks shown in FIG. 3, calculates accumulation times based on equation 1 in correspondence with the divided object image portions, so that the peak values (or average values) have the predetermined value, and determines the longest accumulation time as the next accumulation time. Thereafter, the flow returns to step 220.

In step 270, i.e., if the normal photographing mode is selected, the accumulation control circuit 15 divides an object image signal into portions corresponding to the three blocks shown in FIG. 3, calculates accumulation times based on equation 1 in correspondence with the divided object image portions, so that the peak values (or average values based on equation 2) have the predetermined value, and determines the shortest accumulation time as the next accumulation time. Thereafter, the flow returns to step 220.

With this operation, since the accumulation time is determined in correspondence with the darkest main object portion of an object image in the flash photographing mode, an object image signal of a main object can be controlled to have a proper level without being adversely affected by a bright object in the background.

In step 230, the focus detection calculation circuit 12 may always detect a focus state using the entire focus detection area, but may detect a focus state using only an area, for which an accumulation time is optimized, in the flash photographing mode.

FIG. 10 shows a third example of an operation flow chart of the device of this embodiment. In this example, the accumulation control circuit 15 controls the current accumulation time of the AF sensor 11 using an object image signal obtained in the immediately preceding accumulation operation.

In step 300, a power supply is turned on, and the flow advances to step 310.

In step 310, the accumulation control circuit 15 sets an initial value of the accumulation time since there is no previous object image signal immediately after the power supply is turned on.

In step 320, the accumulation control circuit 15 controls charge accumulation of the AF sensor 11 according to the set accumulation time.

In step 330, the focus detection calculation circuit 12 processes object image signals read from the AF sensor 11, and calculates a defocus amount of the taking optical system 3.

In step 340, the accumulation control circuit 15 receives photographing mode state information from the flashing controller 19 to check if the flashlight 9 is ON. If Y in step 340, the flow advances to step 350; otherwise, the flow advances to step 380.

In step 350, i.e., if the flash photographing mode is selected, the accumulation control circuit 15 determines the next accumulation time based on equation 2, so that the average value of an object image signal has the predetermined value.

In step 360, the accumulation control circuit 15 controls charge accumulation of the AF sensor 11 for the accumulation time determined in step 350.

In step 370, the focus detection calculation circuit 12 processes object image signals read from the AF sensor 11, and calculates a defocus amount of the taking optical system 3. Thereafter, the circuit 12 compares the current defocus amount with the defocus amount calculated in step 330, and finally selects one of the two defocus amounts. In this comparison, for example, a defocus amount corresponding to a nearer distance is selected from the two defocus amounts.

In step 380, the motor control circuit 13 drives the motor 14 to move the taking optical system 3 to an in-focus position on the basis of the calculated defocus amount.

In step 390, the accumulation control circuit 15 determines the next accumulation time based on equation 1, so that the peak value of an object image signal has the predetermined value. Thereafter, the flow returns to step 320.

With the above-mentioned operation, in the flash photographing mode, an accumulation operation for an accumulation time determined based on the peak value of an object image signal like in the normal photographing mode, and an accumulation operation for an accumulation time determined based on the average value of an object image signal while placing an importance on a dark portion of an object are performed, and the two focus detection results are compared to perform final focus detection.

For this reason, when a defocus amount corresponding to a nearer distance is selected from the two defocus amounts as in the above example, and a main object is present at the nearer distance, the focus state of a relatively dark main object can be reliably detected without being adversely affected by a bright object in the background.

Note that a defocus amount corresponding to either a nearer or farther distance may be selected.

The operations in steps 350 and 390 may be modified as follows.

In step 350, i.e., if the flash photographing mode is selected, the accumulation control circuit 15 determines the next accumulation time based on equation 2, so that the average value of an object image signal has a predetermined value k0. Note that the predetermined value k0<a predetermined value k1.

In step 390, the accumulation control circuit 15 determines the next accumulation time based on equation 2, so that the average value of an object image signal has a predetermined value k1. Thereafter, the flow returns to step 320.

With the above-mentioned operation, in the flash photographing mode, an accumulation operation set with a higher average value of an object image signal than that in the normal photographing mode, and an accumulation operation set with a normal average value are performed, and the two focus detection results are compared to perform final focus detection.

The operations in steps 350 and 390 may also be modified as follows.

In step 350, i.e., if the flash photographing mode is selected, the accumulation control circuit 15 determines the next accumulation time based on equation 1, so that the peak value of an object image signal from the central area has the predetermined value.

In step 390, the accumulation control circuit 15 determines the next accumulation time based on equation 1, so that the peak value of object image signals from all the areas has the predetermined value. Thereafter, the flow returns to step 320.

With this operation, in the flash photographing mode, two accumulation operations are performed respectively using the central area and all the areas in determination of the accumulation time, and the two focus detection results are compared to perform final focus detection. In this operation, an average value may be used in place of the peak value.

The operations in steps 350 and 390 may also be modified as follows.

In step 350, i.e., if the flash photographing mode is selected, the accumulation control circuit 15 divides an object image signal into portions corresponding to the three blocks shown in FIG. 3, calculates accumulation times based on equation 1 in correspondence with the divided object image portions, so that the peak values have the predetermined value, and determines the longest accumulation time as the next accumulation time.

In step 390, the accumulation control circuit 15 divides an object image signal into portions corresponding to the three blocks shown in FIG. 3, calculates accumulation times based on equation 1 in correspondence with the divided object image portions, so that the peak values have the predetermined value, and determines the shortest accumulation time as the next accumulation time. Thereafter, the flow returns to step 320.

With this operation, in the flash photographing mode, an accumulation operation for which an accumulation time is determined in correspondence with the darkest object portion of an object image, and an accumulation operation for which an accumulation time is determined in correspondence with the brightest portion of the object image are performed, and the two focus detection results are compared to perform final focus detection. In this operation, an average value may be used in place of the peak value.

In the above-mentioned device, since the accumulation time, in the flash photographing mode, of the charge accumulation type image sensor is set to be longer than that in the normal photographing mode, the focus state of a low-luminance main object can be detected. In addition, since accumulation control in the flash photographing mode is performed for a narrower focus detection area set in the frame than that in the normal photographing mode, the level of an object image signal is optimized for a main object while ignoring a high-luminance background, and the focus state of a low-luminance main object can be detected.

A device according to the second aspect of the present invention, i.e., an embodiment of a focus detection device for executing proper charge accumulation control of an image sensor in a rear light condition, will be described hereinafter. Since the outline of the arrangement of the device is the same as that of the device according to the first aspect of the present invention described above with reference to FIGS. 1 to 3, a detailed description thereof will be omitted. The same reference numerals denote the same parts as in FIGS. 1 to 3.

<Rear Light Detection Operation>

As a rear light detection method in this embodiment, (i) a method using a photometry sensor 16, and (ii) a method using an AF sensor 11 are available. The two detection operations will be described below.

(i) Method Using Photometry Sensor 16

Figure 14A:
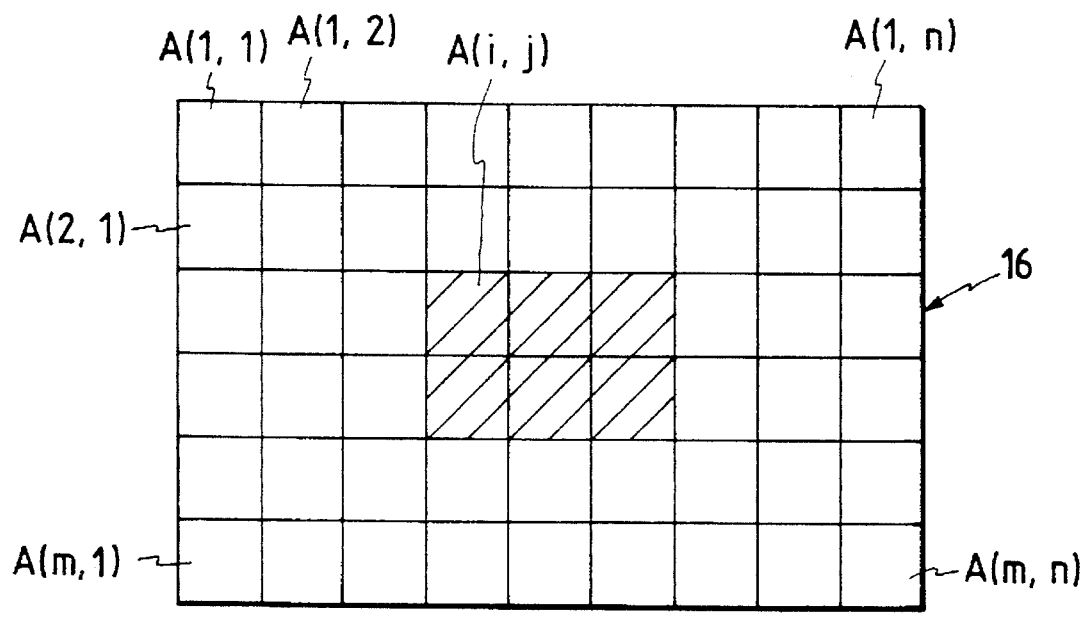
FIGS. 14A and 14B are views showing an example wherein the frame is divided into a plurality of photometry areas.

(i)-i When luminance difference between central areas and peripheral areas of photometry sensor 16 is used The photometry sensor 16 divides a frame into m×n small areas, as shown in, e.g., FIG. 14A, and executes a photometry operation. For example, when such a photometry sensor 16 is used, a rear light condition can be detected by detecting a luminance difference between the central areas and peripheral areas.

Figure 14B:
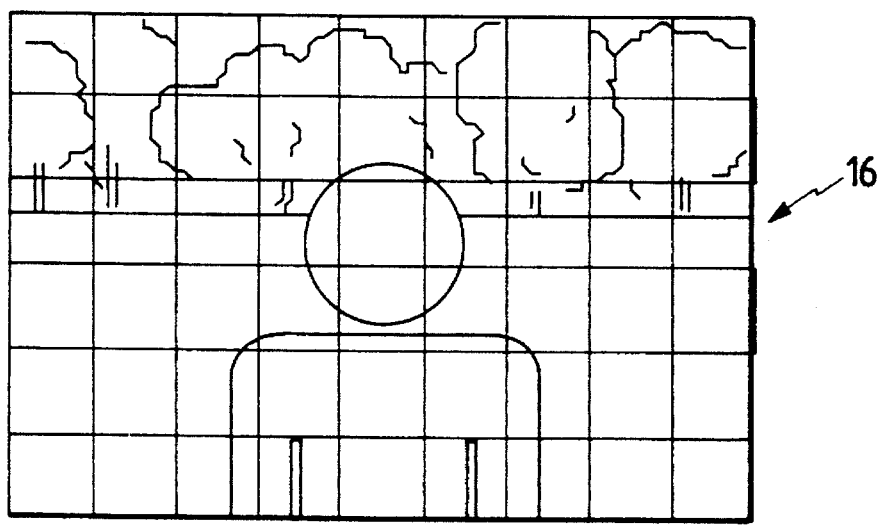

A photometry calculation circuit 17 fetches outputs A(1,1) to A(m,n) from the m×n small areas, and calculates an average value Ac of the outputs from the central areas (hatched areas in FIG. 14A), and an average value Ap of the outputs from the remaining peripheral areas. When a luminance difference between the average value Ap of the outputs from the peripheral areas and the average value Ac of the outputs from the central areas is equal to or larger than a predetermined value, the circuit 17 determines a rear light condition. For example, when a main object is present at the central portion, and a bright object is present in the background, as shown in FIG. 14B, the photometry calculation circuit 17 can determine a rear light condition. When the photometry calculation circuit 17 detects a rear light condition, the circuit 17 determines an optimal exposure value on the basis of the outputs from the central areas; otherwise, the circuit 17 determines an optimal exposure value on the basis of the outputs from both the central and peripheral areas.

(i)-2 When luminance difference between areas at main object position and peripheral areas is used As another rear light detection method, a main object position may be detected, and a rear light condition may be detected by detecting a difference between the luminance at the main object position and the luminance of a peripheral portion.

For example, in response to a half-stroke depression of a release button, outputs from central areas (hatched areas in FIG. 14A) of outputs A(1,1) to A(m,n) from the m×n small areas of the photometry sensor 16 are fetched and stored, and the stored outputs are pattern-matched with outputs A(1,1) to A(m,n) obtained in the next photometry operation, thereby discriminating areas having the highest correlation with the stored outputs. The outputs from the discriminated areas are stored as a new pattern of a main object. Upon repetition of the above operations, areas where a main object is present can always be discriminated, and the position of the discriminated areas can be specified as that of the main object.

As described above, a main object position is detected by automatically tracing the movement of a main object in the frame, and a rear light condition can be detected based on a luminance difference between areas near the detected main object position and peripheral areas.

The above-mentioned technique for detecting a main object position by automatically tracing the movement of a main object in the frame is disclosed in detail in, e.g., Japanese Patent Laid-Open No. 60-249477.

Figure 13A:
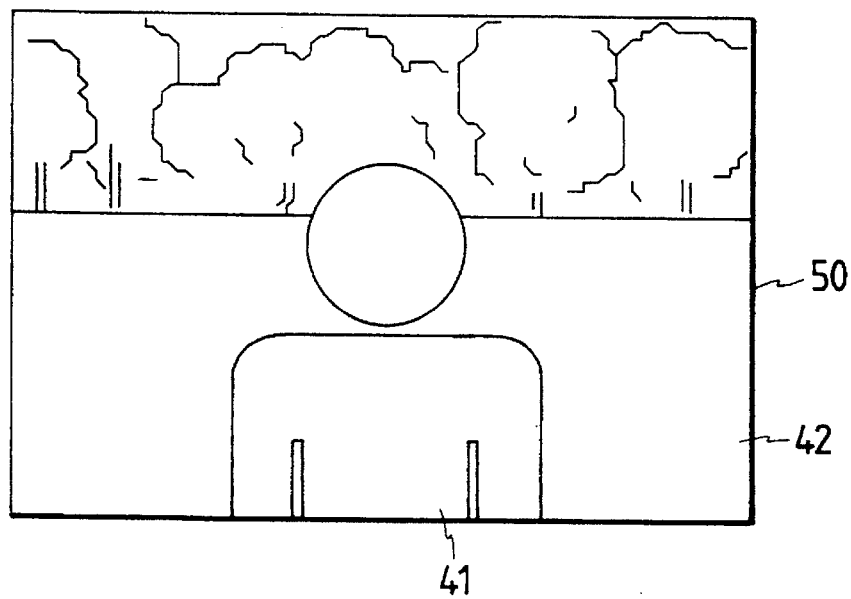
FIGS. 13A and 13B are explanatory views respectively showing an example of an object in a frame, and a focus detection area in the frame.
Figure 15A:
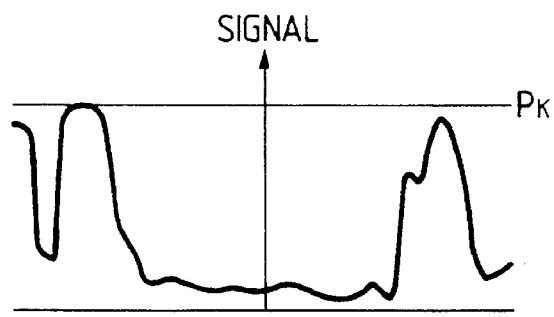
FIGS. 15A to 15C are charts for explaining an object image signal.
Figure 16:
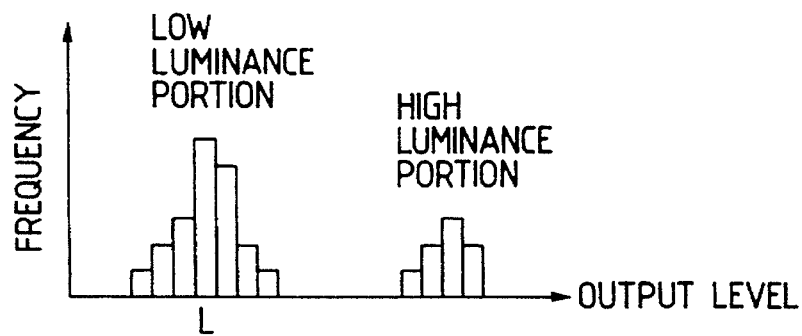

(ii) Method Using Object Image Signal from AF Sensor (ii)-i When histogram is used In a rear light condition shown in FIG. 13A, an object image signal shown in FIG. 15A is obtained. When the output level of the object image signal is plotted along the abscissa, and the accumulated frequency of output levels in units of predetermined divisions is plotted along the ordinate, a histogram shown in FIG. 16 is formed.

When it is determined that a distribution is separated into high- and low-luminance portions like in this histogram, and a difference between the average output values of these portions is equal to or larger than a predetermined value, a rear light condition can be determined. Whether or not the distribution is separated into high- and low-luminance portions is determined when it is detected that the accumulated frequency of a certain division is 0, and divisions each having an accumulated frequency of 1 or more are present before and after the certain division.

(ii)-2 When average values in units of blocks are used

Figure 13B:
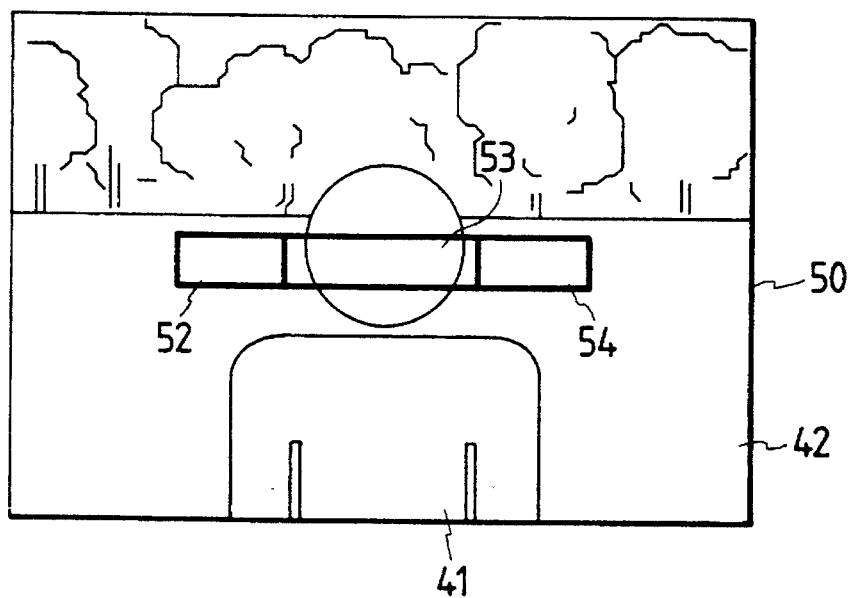

Average values of object image signals are calculated in units of three-divided blocks, as shown in FIG. 13B, and when a difference obtained by subtracting the average value of a central block 53 from that of a peripheral block 52 (or 54) is equal to or larger than a predetermined value, it is determined that a main object in a rear light condition is present at the central portion.

<Accumulation Control Operation>

As accumulation control methods of this embodiment, (1) a method using monitor signals, (2) a method using an object image signal obtained in an immediately preceding accumulation operation, (3) a method using an object image signal according to a main object position, and (4) a method using a photometry calculation value are available. These methods will be described hereinafter.

(1) Method Using Monitor Signals

Figure 11A:
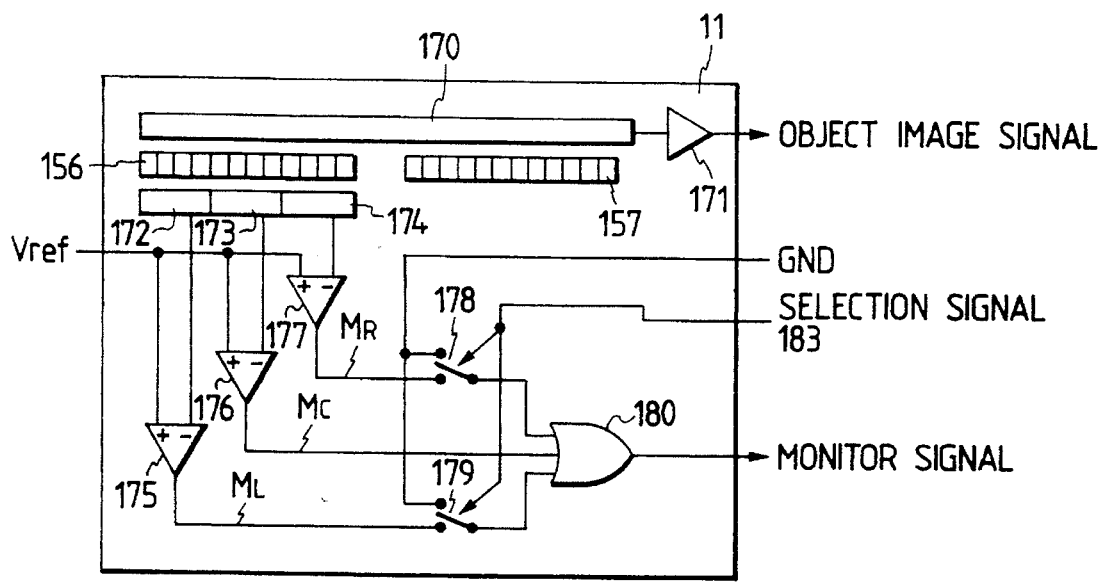

FIG. 11A shows an arrangement of the AF sensor 11 having a monitor circuit for controlling an accumulation time.

A pair of light-receiving portions 156 and 157 each constituted by a plurality of pixels start charge accumulation in response to an accumulation start signal (not shown) from an accumulation control circuit 15. The accumulated charges are transferred to a shift register 170 in response to an accumulation end signal (not shown), are amplified by an amplifier 171, and are then output as object image signals.

Monitor portions 172, 173, and 174 arranged near the light-receiving portion 156 respectively detect average levels of the intensities of object image portions respectively formed on the left, central, and right areas of the light-receiving portion 156. These monitor portions start charge accumulation in response to the accumulation start signal, and generate monitor voltage signals corresponding to the accumulated charge amounts.

The monitor voltage signals and a reference voltage Vref are input to comparators 175, 176, and 177, and are compared with each other. Outputs ML, MC, and MR from the comparators 175, 176, and 177 are inverted from L (Low) level to H (High) level when the corresponding monitor voltage signal becomes equal to or lower than Vref.

The outputs ML and MR and a signal GND are input to an OR gate 180 via switches 178 and 179 which are controlled by a selection signal 183 from the accumulation control circuit 15, and the output MC is directly input to the OR gate 180. The accumulation control circuit 15 controls to output the accumulation end signal to the light-receiving portions 156 and 157 upon detection of rising from L level to H level of a monitor signal as an output from the OR gate 180.

The monitor voltage signals (A), (C), and (E), and the outputs ML(B), MC(D), and MR(F) will be described below with reference to FIG. 12.

Each of the monitor voltage signals (A), (C), and (E) is reset to a reset level before accumulation is started. After the accumulation is started, the voltage of each monitor voltage signal is gradually decreased according to the accumulated charge amount. The rate of decrease in voltage is determined according to the luminance of an object image. When the object image is dark, the rate is small like in the monitor voltage signal (A); otherwise, the rate is large like in the monitor voltage signal (E).

The monitor voltage signals (A), (C), and (E) are compared with the reference voltage Vref by the comparators 175, 176, and 177, and when the monitor voltage signal becomes equal to or lower than Vref, a corresponding one of the outputs ML(B), MC(D), and MR(F) from the comparators 175, 176, and 177 is inverted from L level to H level.

The time intervals from the beginning of accumulation until inversion of the corresponding comparator outputs correspond to times required until the pixel outputs from the left, central, and right areas of the light-receiving portion 156 corresponding to the monitor portions 172, 173, and 174 have proper levels.

The accumulation control circuit 15 can select, in accordance with the selection signal 183, whether the pixel output level is optimized in correspondence with the central block 53 of the focus detection area, or the pixel output levels of all the three blocks of the focus detection area are optimized.

More specifically, a monitor signal output obtained upon selection of the central block 53 corresponds to a signal (G) in FIG. 12, and a time from the beginning of accumulation until the monitor signal output (G) is inverted from L level to H level is determined as an accumulation time for the light-receiving portions 156 and 157. On the other hand, a monitor signal output upon selection of the entire focus detection area corresponds to a signal (H) in FIG. 12, and a time from the beginning of accumulation until the monitor signal output (H) is inverted from L level to H level in correspondence with the brightest block is determined as an accumulation time for the light-receiving portions 156 and 157.

In general, since a main object is highly possibly present at the center of the frame, the monitor area is limited to only the central area, so that an object image signal can have a proper level for the main object without being adversely affected by a bright object present in a background 42.

Therefore, in, e.g., a rear light condition, the monitor area need only be limited to the central area, so that an object image signal can have a proper level for a main object.

The accumulation control circuit 15 can execute accumulation control placing an importance on a bright portion of an object image by increasing the reference voltage Vref, and can execute accumulation control placing an importance on a dark portion of an object image by decreasing the reference voltage vref.

A modification of FIG. 11A will be described below with reference to FIG. 11B.

Figure 11B:
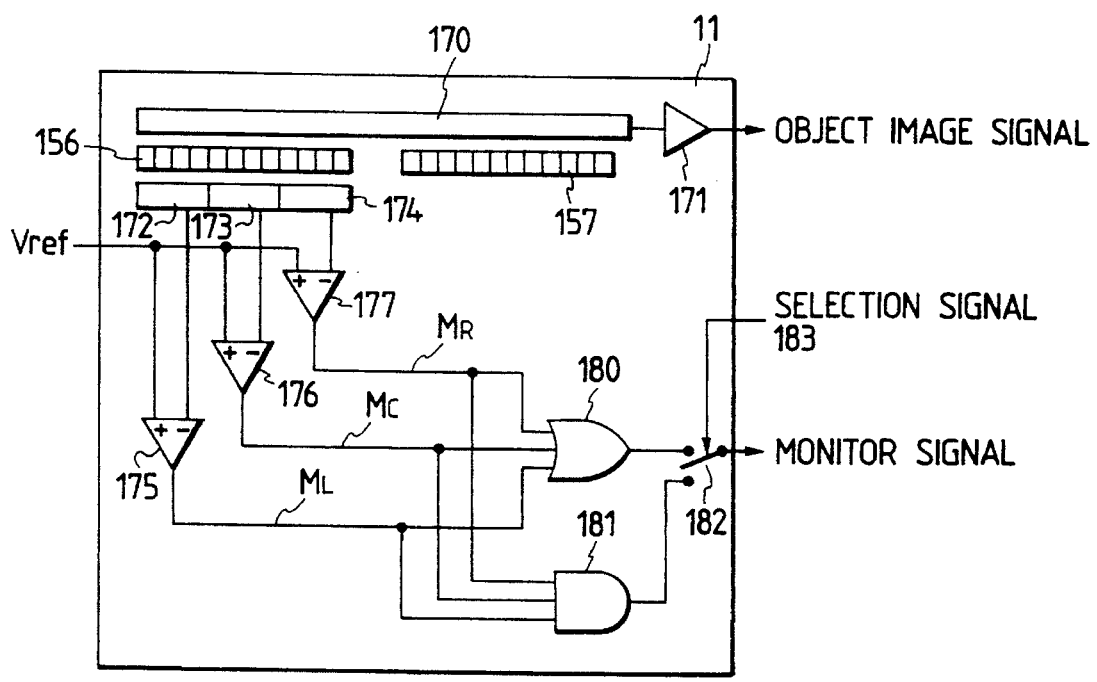
FIG. 11B is a circuit diagram showing another arrangement of the monitor circuit.

The arrangement shown in FIG. 11B is substantially the same as the monitor portions 172, 173, and 174, the comparators 175, 176, and 177, and the like in the arrangement shown in FIG. 11A, except that the outputs ML and MR are always input to the OR gate 180, the outputs ML, MC, and MR are input to an AND gate 181, and one of the outputs from the AND gate 181 and the OR gate 180 is selected as a monitor signal output by a switch 182 according to the selection signal 183. Therefore, a monitor signal output from the OR gate 180 corresponds to the output, which is inverted from L level to H level earliest, of the outputs ML, MC, and MR, and a monitor signal output from the AND gate 181 corresponds to the output, which is inverted from L level to H level latest, of the outputs ML, MC, and MR.

In a normal photographing mode, the output from the OR gate 180 is used as a monitor signal, and when an importance is placed on a low-luminance object, the output from the AND gate 181 is used as a monitor signal. Thus, in, e.g., a rear light condition, accumulation control placing an importance on a dark portion of an object image can be performed using the output from the AND gate 181 as a monitor signal.

(2) Method Using Object Image Signal Obtained in Immediately Preceding Accumulation Operation (2)-1 When peak value of object image signal is used as predetermined value for determining accumulation time In this method, the AF sensor 11 starts charge accumulation in response to the accumulation start signal from the accumulation control circuit 15, the charge accumulation of the AF sensor 11 is ended when the peak value of object image signals from the pixels of the sensor 11 reaches a predetermined value, and a focus state is detected on the basis of the object image signal obtained at the end of accumulation. For example, the charge accumulation of the AF sensor 11 is ended when the peak value of an object image signal from a certain pixel reaches a predetermined value Pk, as shown in FIG. 15A.

When the accumulation time in the immediately preceding accumulation operation is represented by Tp, the peak value of an object image signal is represented by Pp, and the predetermined value is represented by Pk, an accumulation time Tq to be currently controlled is determined by the following equation 1.

$$Tq = Tp \times Pk/Pp \qquad \text{EQUATION 1}$$

A peak value Pq of an object image signal currently accumulated for the accumulation time Tq has the same value as the predetermined value Pk.

When the object image signal is used in this manner, the mode switching operation described in the method (1) may be performed as well. More specifically, a control mode may be switched between the entire mode for extracting the peak value Pp from object image signals corresponding to the entire focus detection area 51 shown in FIG. 3 and the center mode for extracting the peak value Pp from the central area 53 of the focus detection area according to a situation.

In this case, when the entire mode is selected in a situation shown in, e.g., FIG. 13B, an object image signal shown in FIG. 15A is obtained as a result of processing, and a peak value corresponding to a bright portion in the background is extracted as the predetermined value Pk.

Figure 15B:
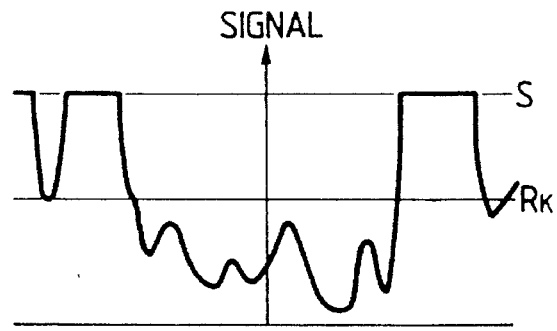
Figure 15C:
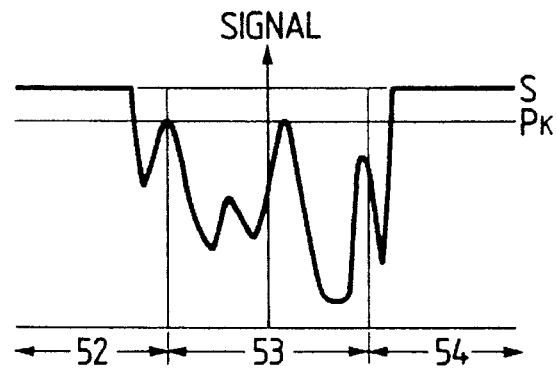

When the center mode is selected in the same situation, an object image signal shown in FIG. 15C is obtained as a result of processing, and a peak value corresponding to a person 41 portion is extracted as the predetermined value Pk. In this case, a bright portion is clipped at a saturation level S of a signal. In this manner, an object image signal can be controlled to have a proper level for a main object without being adversely affected by a bright object in a background 42.

Even when the entire mode is fixed in place of performing mode switching operations, the accumulation control circuit 15 can execute accumulation control placing an importance on a dark portion of an object image by changing the predetermined value Pk to be a higher value.

Equation 1 may be applied to each of three-divided blocks, as shown in FIG. 3, so as to calculate optimal accumulation times of the three blocks, and when an importance is to be placed on a dark portion, the longest accumulation time may be employed.

(2)-2 When average value of object image signal is used as predetermined value for determining accumulation time In this method, the AF sensor 11 starts charge accumulation in response to the accumulation start signal from the accumulation control circuit 15, the charge accumulation of the AF sensor 11 is ended when an average value of object image signals from the pixels of the AF sensor 11 reaches a predetermined value, and a focus state is detected based on the object image signal at the end of accumulation. For example, when an average value of an object image signal from a certain pixel reaches a predetermined value Rk, as shown in FIG. 15B, the charge accumulation of the AF sensor 11 is ended.

When the accumulation time in the immediately preceding accumulation operation is represented by Tp, the average value of an object image signal is represented by Rp, and a predetermined value is represented by Rk, an accumulation time Tq to be currently controlled is determined by the following equation 2.

$$Tq = Tp \times Rk/Rp \qquad \text{EQUATION 2}$$

The average value Rq of an object image signal currently accumulated for this accumulation time has the same value as the predetermined value Rk.

In a follow light condition, the peak value of an object image signal may be used as the predetermined value for determining the accumulation time, and in rear light condition, the average value of an object image signal may be used as the predetermined value, so that an object image signal of a dark main object can be controlled to have a proper level.

For example, assume that the entire mode is selected in a situation shown in FIG. 13B, and the predetermined values Pk and Rk are equal to each other. An object image signal obtained in a follow light condition is as shown in FIG. 15A, and an object image signal obtained in a rear light condition is as shown in FIG. 15B. In the method of controlling the accumulation time based on the average value, the level of an object image signal corresponding to a dark person 41 portion is increased as compared to the method of controlling the accumulation time based on the peak value. In this method, a bright portion is clipped at the saturation level S of the signal. For this reason, an object image signal having a proper level for the person 41 can be obtained.

In this case, a control mode may be switched between the center mode and the entire mode as in the description of the method (1).

More specifically, the control mode may be switched between the entire mode for obtaining the average value Rp from object image signals corresponding to the entire focus detection area 51 shown in FIG. 3 and the center mode for extracting the average value Rp from the central area 53 of the focus detection area shown in FIG. 3.

When the center mode is selected in a certain situation, the average value of the person 41 portion of an object image signal obtained as a result of processing has the predetermined value Pk. For this reason, the level of the object image signal corresponding to the person 41 portion can become larger than that obtained when the entire mode is selected.

In the entire mode, the accumulation control circuit 15 may change the predetermined value Rk to be a higher value, or may calculate optimal accumulation times in units of blocks by applying equation 2 to each of three-divided blocks, as shown in FIG. 3, as in the description of the method (2)-1.

(2)-3 When high-luminance distribution portion of object image signal is excluded FIG. 16 shows a histogram of the output levels of an object image signal shown in FIG. 15A. In this histogram, assume that it is determined that a distribution is separated into high- and low-luminance portions as in the description of the rear light detection operation (2)-1. When a level exhibiting the maximum frequency of the low-luminance portion is represented by L while ignoring the high-luminance distribution portion, an accumulation time in the immediately preceding accumulation operation is represented by Tp, and a predetermined value is represented by Rk, an accumulation time Tq to be currently controlled is determined by the following equation 3, thereby controlling an average value Rq of an object image signal to be currently obtained to the predetermined value Rk.

$$Tq = Tp \times Rk/L \quad \text{EQUATION 3}$$

Upon formation of a histogram, an object image signal reaching the saturation level S is excluded. When the distribution of the histogram is not separated, the maximum frequency level of the entire distribution serves as the level L.

(3) Method Using Object Image Signal According to Main Object Position

When a main object position can be detected by automatically tracing the movement of a main object in the frame, the focus detection area is divided into three blocks, as shown in FIG. 3, and equation 1 or 2 is applied to a block closest to the detected main object position so as to calculate an optimal accumulation time.

When the focus detection area is expanded to the entire frame, and the number of blocks is increased, the accumulation time can always be optimized using a block where a main object is located. Thus, no problem is posed even when a high-luminance object is present in the background 42.

(4) Method Using Photometry Calculation Value

Since the object luminance is inversely proportional to the accumulation time, when a coefficient of proportion is represented by K, and an optimal exposure value calculated by the photometry calculation circuit 17 is represented by E (calculated as an EV value), an accumulation time Tq to be currently controlled can be determined by the following equation 4.

$$Tq = K/2^E \quad \text{EQUATION 4}$$

In general, since the photometry sensor 16 detects an average luminance of an object, even when a high-luminance portion is locally present, the sensor 16 ignores this portion, and generates an output corresponding to an average luminance level. The photometry calculation circuit 17 calculates an optimal exposure value on the basis of this output.

The accumulation control circuit 15 can execute accumulation control placing an importance on a dark portion of an object image by controlling the accumulation time according to the photometry calculation value as in equation 4.

Therefore, when a follow light condition is detected, the accumulation time can be controlled using the peak value of an object image signal, and when a rear light condition is detected, the accumulation time can be determined on the basis of the photometry calculation value, so that an object image signal of the dark person 41 portion can be controlled to have a proper level.

When the photometry sensor 16 executes a photometry operation using multiple-divided photographing frames, the photometry calculation circuit 17 discriminates from a plurality of photometry sensor outputs that a high-luminance portion is locally present, and calculates an optimal exposure value for a main object while automatically ignoring this portion. Then, the accumulation time is determined based on a photometry calculation value obtained using the remaining areas, so that an object image signal of the dark person 41 portion can be controlled to have a proper level.

Figure 17:
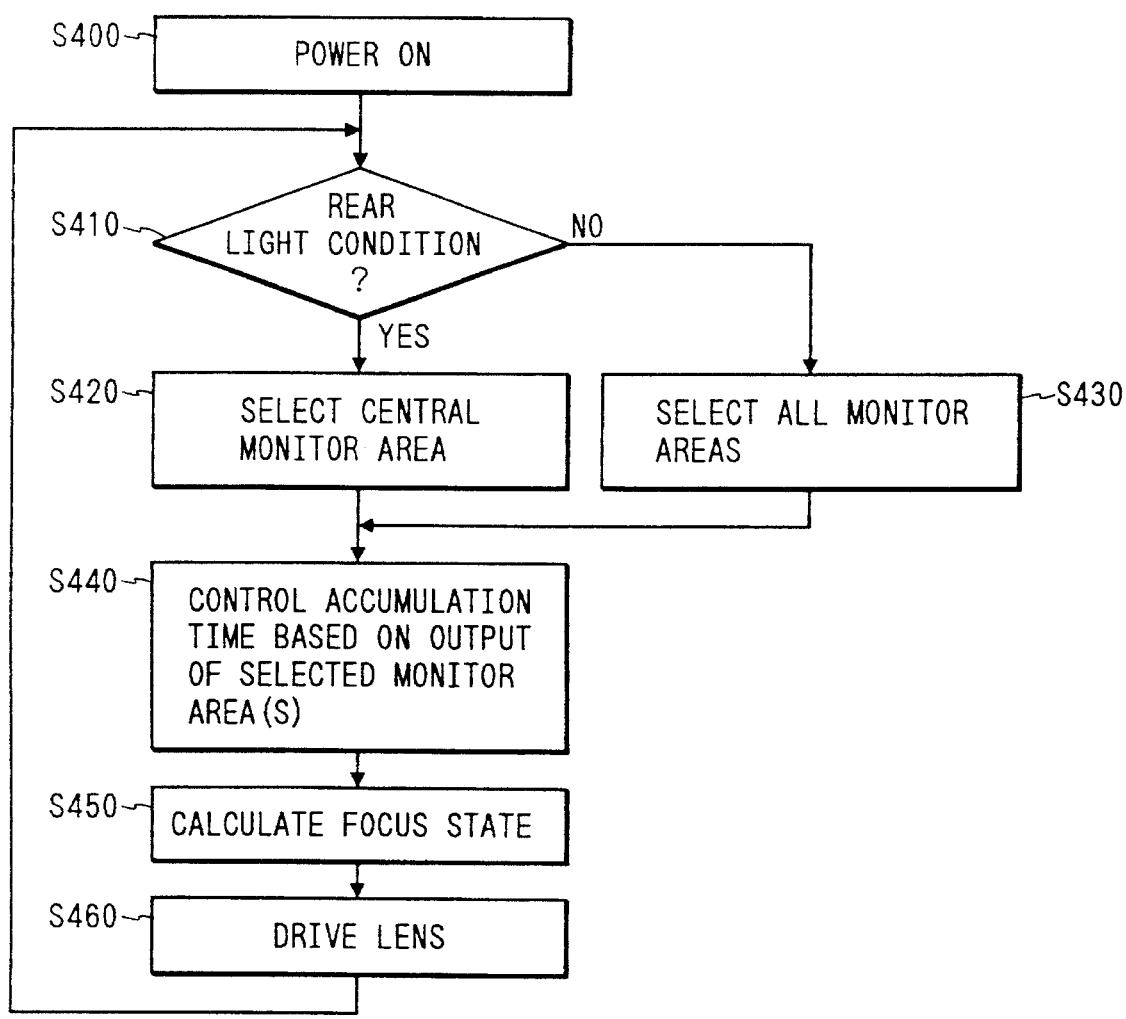

FIG. 17 shows a first example of an operation flow chart of this embodiment. In this example, the accumulation control circuit 15 controls the accumulation time of the AF sensor 11 using monitor signals. In this case, the arrangement of the AF sensor 11 shown in FIG. 11A is used.

In step 400, a power supply is turned on, and the flow advances to step 410.

In step 410, the accumulation control circuit 15 receives rear light condition information from the photometry calculation circuit 17 to check if a rear light condition is detected. If Y in step 410, the flow advances to step 420; otherwise, the flow advances to step 430.

In step 420, the accumulation control circuit 15 sets the selection signal 183 to select the monitor portion 173, and executes control for optimizing the pixel output level in correspondence with the central block 53 of the focus detection area.

In step 430, the accumulation control circuit 15 sets the selection signal 183 to select the monitor portions 172, 173, and 174, and executes control for optimizing the pixel output level in correspondence with the entire focus detection area.

In step 440, the accumulation control circuit 15 controls the accumulation time of the AF sensor 11 using the selected monitor portion(s).

In step 450, a focus detection calculation circuit 12 processes object image signals read from the AF sensor 11, and calculates a defocus amount of a taking optical system 3.

In step 460, a motor control circuit 13 drives a motor 14 to move the taking optical system 3 to a focusing position on the basis of the calculated defocus amount. Thereafter, the flow returns to step 410 to repeat the above-mentioned operation.

With the above-mentioned operation, in a rear light condition, the monitor area of the focus detection area is automatically limited from the entire area to the central area. In general, since a main object is highly possibly present at the center of the frame, the monitor area is limited to only the central area, so that an object image signal can have a proper level for the main object without being adversely affected by a bright object present in the background 2.

In step 410, a rear light condition is determined on the basis of the information from the photometry calculation circuit 17. Immediately after the power supply is turned on, a follow light state may be uniquely determined, and in the next and subsequent operations, the accumulation control circuit 15 may determine a rear light condition using an object image signal obtained in the immediately preceding accumulation operation.

In step 450, the focus detection calculation circuit 12 may always detect a focus state using the entire focus detection area, or may detect a focus state using only the central portion of the focus detection area in correspondence with the monitor area in a rear light condition.

The operations in steps 420, 430, and 440 may be modified as follows.

In step 420, the accumulation control circuit 15 sets the selection signal 183 to select the monitor portions 172, 173, and 174, executes control for optimizing the pixel output level in correspondence with the entire focus detection area, and sets the reference voltage Vref to be lower than a normal voltage value.

In step 430, the accumulation control circuit 15 sets the selection signal 183 to select the monitor portions 172, 173, and 174, executes control for optimizing the pixel output level in correspondence with the entire focus detection area, and sets the reference voltage Vref to be a normal voltage value.

In step 440, the accumulation control circuit 15 controls the accumulation time of the AF sensor 11 using the monitor portions 172, 173, and 174 based on the reference voltage set in step 420 or 430.

With this operation, in a rear light condition, the reference voltage Vref is automatically lowered, and the accumulation time is prolonged as compared to a normal time. Therefore, an object image signal for a main object portion can have an optimal level even for a low-luminance main object in a rear light condition.

When the arrangement of the AF sensor 11 shown in FIG. 11B is employed, the operations in steps 420, 430, and 440 may be modified as follows.

In step 420, the accumulation control circuit 15 sets the selection signal 183 to select the output from the AND gate 181 as a monitor signal, thereby selecting the latest one of the monitor outputs ML, MC, and MR from the monitor portions 172, 173, and 174.

In step 430, the accumulation control circuit 15 sets the selection signal 183 to select the output from the OR gate 180 as a monitor signal, thereby selecting the earliest one of the monitor outputs ML, MC, and MR from the monitor portions 172, 173, and 174.

In step 440, the accumulation control circuit 15 controls the accumulation time of the AF sensor 11 using the selected monitor signal.

With this operation, in a rear light condition, since the latest one of the monitor outputs ML, MC, and MR is selected, the accumulation time is optimized in correspondence with a dark portion of an object.

Therefore, an object image signal for a main object portion can have an optimal level even for a low-luminance main object in a rear light condition.

Figure 18:
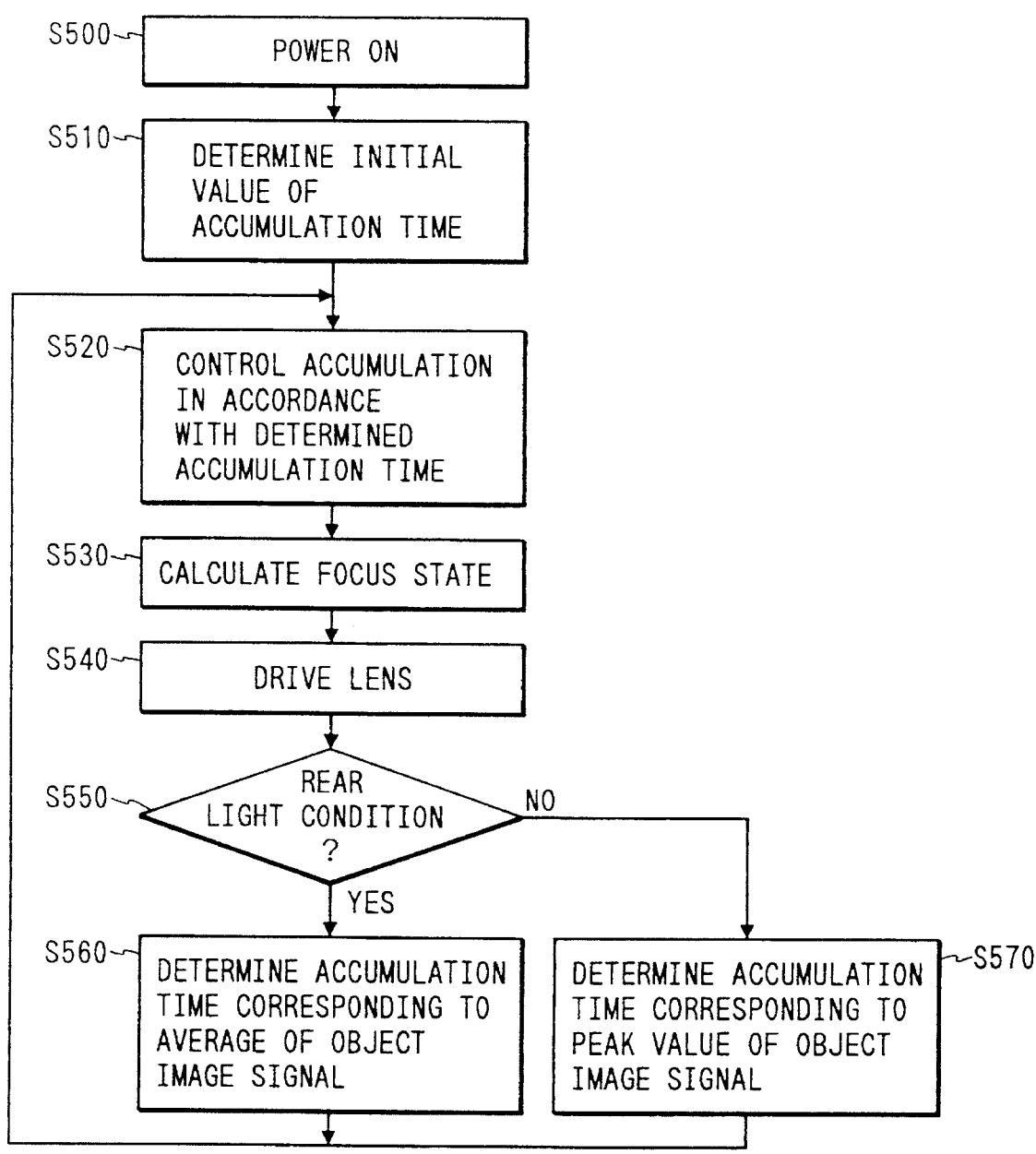

FIG. 18 shows a second example of an operation flow chart of this embodiment. In this example, the accumulation control circuit 15 controls a current accumulation time of the AF sensor 11 using an object image signal obtained in the immediately preceding accumulation operation.

In step 500, a power supply is turned on, and the flow advances to step 510.

In step 510, the accumulation control circuit 15 sets an initial value of the accumulation time since there is no previous object image signal immediately after the power supply is turned on.

In step 520, the accumulation control circuit 15 controls charge accumulation of the AF sensor 11 according to the set accumulation time.

In step 530, the focus detection calculation circuit 12 processes object image signals read from the AF sensor 11, and calculates a defocus amount of the taking optical system 3.

In step 540, the motor control circuit 13 drives the motor 14 to move the taking optical system 3 to an in-focus position on the basis of the calculated defocus amount.

In step 550, the accumulation control circuit 15 receives rear light condition information from the photometry calculation circuit 17 to check if a rear light condition is detected. If Y In step 550, the flow advances to step 560; otherwise, the flow advances to step 570.

In step 560, the accumulation control circuit 15 determines the next accumulation time on the basis of equation 2, so that the average value of an object image signal has the predetermined value. Thereafter, the flow returns to step 520.

In step 570, the accumulation control circuit 15 determines the next accumulation time on the basis of equation 1, so that the peak value of an object image signal has the predetermined value. Thereafter, the flow returns to step 520.

With the above-mentioned operation, since the accumulation time is determined using the peak value of an object image signal in a follow light condition, the accumulation time is optimized, so that a bright portion of an object image signal has a proper level. On the other hand, in a rear light condition, the accumulation time is determined using the average value of an object image signal.

In step 550, a rear light condition is determined on the basis of the information from the photometry calculation circuit 17. However, the accumulation control circuit 15 may determine a rear light condition using an object image signal, as described above.

In step 560, in place of determining the accumulation time, so that the average value has the predetermined value, the accumulation time may be determined according to equation 3, so that the level having the maximum frequency has the predetermined value, or the accumulation time may be determined on the basis of an optimal exposure calculation value according to equation 4.

The operations in steps 560 and 570 may be modified as follows.

In step 560, the accumulation control circuit 15 determines the next accumulation time based on equation 2, so that the average value of an object image signal has a predetermined value k0. The flow then returns to step 520. Note that the predetermined value k0<a predetermined value k1.

In step 570, the accumulation control circuit 15 determines the next accumulation time based on equation 2, so that the average value of an object image signal has a predetermined value k1. Thereafter, the flow returns to step 520.

With the above operation, in a rear light condition, since the accumulation time is determined, so that the average value of an object image signal becomes higher than that in a follow light condition (the predetermined value k0<the predetermined value k1), an object image signal of a relatively dark main object can have a proper level. In this operation, a peak value may be used in place of the average value.

The operations in steps 560 and 570 may also be modified as follows.

In step 560, the accumulation control circuit 15 determines the next accumulation time based on equation 1, so that the peak value of an object image signal from the central area has the predetermined value. The flow then returns to step 520.

In step 570, the accumulation control circuit 15 determines the next accumulation time based on equation 1, so that the peak value of object image signals from all the areas has the predetermined value. Thereafter, the flow returns to step 520.

In this case, in step 530, the focus detection calculation circuit 12 may detect a focus state using the entire focus detection area 51 in a follow light condition, or may detect a focus state using the focus detection area 53 in a rear light condition.

With the above-mentioned operation, in a rear light condition, an area of an object image to be used in determination of the accumulation time is automatically narrowed from all the areas to the central area. In general, since a main object is highly possibly present at the center of the frame, the monitor area is limited to only the central area, so that an object image signal can have a proper level for the main object. In the above operation, an average value may be used in place of the peak value.

The operations in steps 560 and 570 may also be modified as follows.

In step 560, the accumulation control circuit 15 divides an object image signal into portions corresponding to the three blocks shown in FIG. 3, calculates accumulation times based on equation 1 in correspondence with the divided object image portions, so that the peak values have the predetermined value, and determines the longest accumulation time as the next accumulation time. Thereafter, the flow returns to step 520.

In step 570, the accumulation control circuit 15 divides an object image signal into portions corresponding to the three blocks shown in FIG. 3, calculates accumulation times based on equation 1 in correspondence with the divided object image portions, so that the peak values have the predetermined value, and determines the shortest accumulation time as the next accumulation time. Thereafter, the flow returns to step 520.

In this case, in step 530, the focus detection calculation circuit 12 may detect a focus state using the entire focus detection area 51 in a follow light condition, or may detect a focus state using the focus detection area 53 in a rear light condition.

With this operation, since the accumulation time is determined in correspondence with the darkest main object portion of an object image in a rear light condition, an object image signal can have a proper level for a main object. Note that in the above operation, an average value may be used in place of the peak value.

Figure 19:
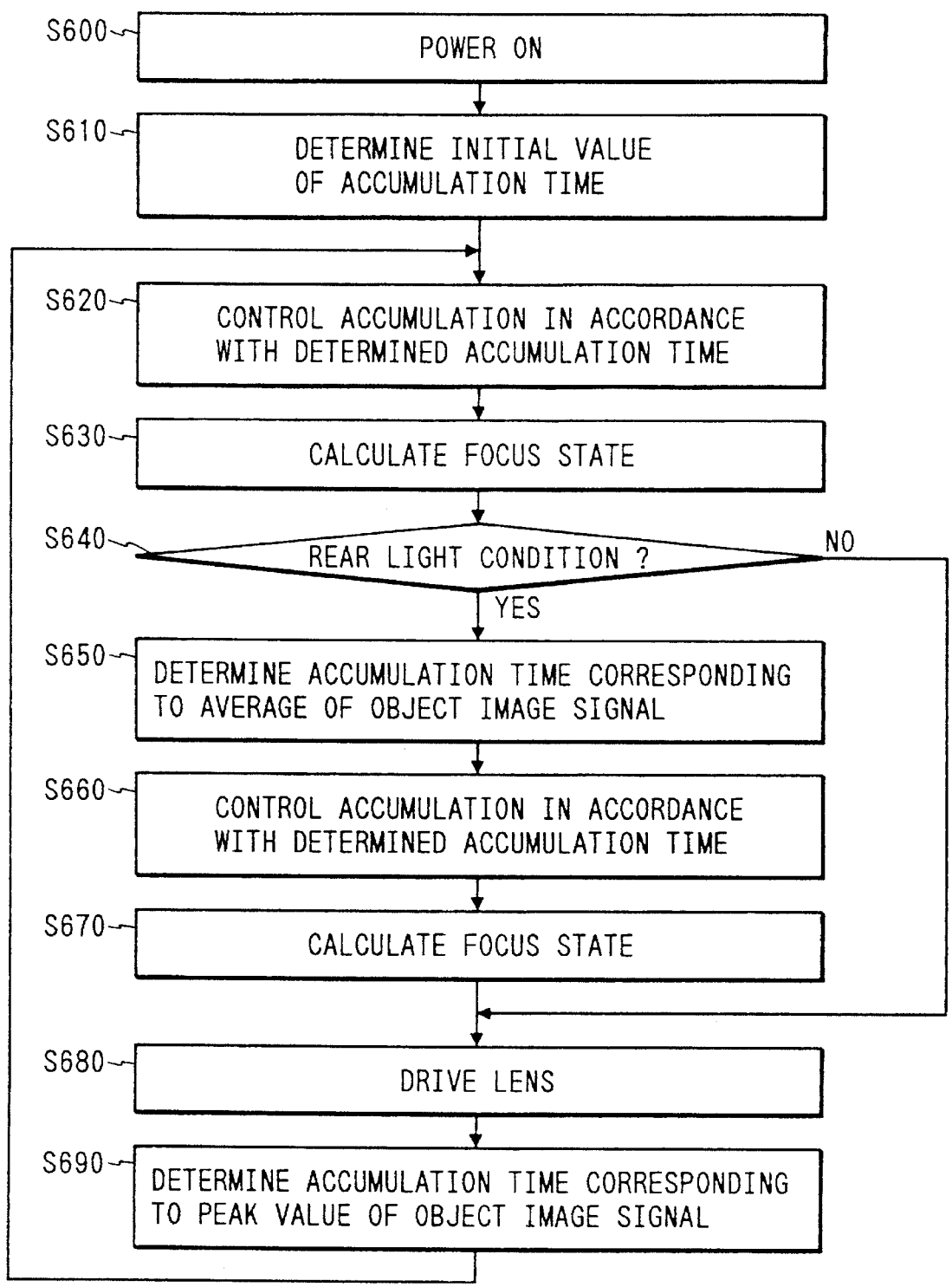

FIG. 19 shows a third example of an operation flow chart of this embodiment. In this example, the accumulation control circuit 15 controls a current accumulation time of the AF sensor 11 using an object image signal obtained in the immediately preceding accumulation operation. A difference from the operation flow chart shown in FIG. 18 is that focus detection results for different accumulation times are compared with each other.

In step 600, a power supply is turned on, and the flow advances to step 610.

In step 610, the accumulation control circuit 15 sets an initial value of the accumulation time since there is no previous object image signal immediately after the power supply is turned on.

In step 620, the accumulation control circuit 15 controls charge accumulation of the AF sensor 11 according to the set accumulation time.

In step 630, the focus detection calculation circuit 12 processes object image signals read from the AF sensor 11, and calculates a defocus amount of the taking optical system 3.

In step 640, the accumulation control circuit 15 receives rear light condition information from the photometry calculation circuit 17 to check if a rear light condition is detected. If Y In step 640, the flow advances to step 650; otherwise, the flow advances to step 680.

In step 650, i.e., if a rear light condition is detected, the accumulation control circuit 15 determines the next accumulation time based on equation 2, so that the average value of an object image signal has the predetermined value.

In step 660, the accumulation control circuit 15 controls charge accumulation of the AF sensor 11 for the accumulation time determined in step 650.

In step 670, the focus detection calculation circuit 12 processes object image signals read from the AF sensor 11, and calculates a defocus amount of the taking optical system 3. Thereafter, the circuit 12 compares the current defocus amount with the defocus amount calculated in step 630, and finally selects one of the two defocus amounts. In this comparison, for example, a defocus amount corresponding to a nearer distance is selected from the two defocus amounts.

In step 680, the motor control circuit 13 drives the motor 14 to move the taking optical system 3 to an in-focus position on the basis of the defocus amount calculated in step 630 or 670.

In step 690, the accumulation control circuit 15 determines the next accumulation time based on equation 1, so that the peak value of an object image signal has the predetermined value. Thereafter, the flow returns to step 620.

With the above-mentioned operation, in a rear light condition, an accumulation operation for an accumulation time determined based on the peak value of an object image signal like in a follow light condition, and an accumulation operation for an accumulation time determined based on the average value of an object image signal while placing an importance on a dark portion of an object are performed, and the two focus detection results are compared with each other to obtain a focus detection result satisfying a predetermined condition (e.g., a focus detection result at the nearest side is selected). Thereafter, final focus detection is performed. For this reason, a focus state of a dark main object can be reliably detected.

In step 640, a rear light condition is determined on the basis of the information from the photometry calculation circuit 17. However, the accumulation control circuit 15 may determine a rear light condition using an object image signal, as described above.

The operations in steps 650 and 690 may be modified as follows.

In step 650, i.e., if a rear light condition is detected, the accumulation control circuit 15 determines the next accumulation time based on equation 2, so that the average value of an object image signal has a predetermined value k0. Note that the predetermined value k0<a predetermined value k1.

In step 690, the accumulation control circuit 15 determines the next accumulation time based on equation 2, so that the average value of an object image signal has a predetermined value k1. Thereafter, the flow returns to step 620.

With the above operation, in a rear light condition, an accumulation operation in which the average value of an object image signal is set to be higher than that in a follow light condition, and an accumulation operation in the follow light condition are performed, and the two focus detection results are compared with each other to obtain a focus detection result satisfying the predetermined condition. Thereafter, final focus detection is executed. Thus, a focus state of a dark main object can be reliably detected.

In the above operation, a peak value may be used in place of the average value.

The operations in steps 650 and 690 may also be modified as follows.

In step 650, i.e., if a rear light condition is detected, the accumulation control circuit 15 determines the next accumulation time based on equation 1, so that the peak value of an object image signal from the central area has the predetermined value.

In step 690, the accumulation control circuit 15 determines the next accumulation time based on equation 1, so that the peak value of object image signals from all the areas has the predetermined value. Thereafter, the flow returns to step 620.

With this operation, in a rear light condition, two accumulation operations are performed respectively using the central area and all the areas in determination of the accumulation time, and the two focus detection results are compared to obtain a focus detection result satisfying the predetermined condition. Thereafter, final focus detection is executed. In general, since a main object is highly possibly present at the center of the frame, the monitor area is limited to only the central area, so that a focus state of a main object can be reliably detected. In the above operation, an average value may be used in place of the peak value.

The operations in steps 650 and 690 may also be modified as follows.

In step 650, i.e., if a rear light condition is selected, the accumulation control circuit 15 divides an object image signal into portions corresponding to the three blocks shown in FIG. 3, calculates accumulation times based on equation 1 in correspondence with the divided object image portions, so that the peak values have the predetermined value, and determines the longest accumulation time as the next accumulation time.

In step 690, the accumulation control circuit 15 divides an object image signal into portions corresponding to the three blocks shown in FIG. 3, calculates accumulation times based on equation 1 in correspondence with the divided object image portions, so that the peak values have the predetermined value, and determines the shortest accumulation time as the next accumulation time. Thereafter, the flow returns to step 620.

With this operation, in a rear light condition, an accumulation operation for which an accumulation time is determined in correspondence with the darkest object portion of an object image, and an accumulation operation for which an accumulation time is determined in correspondence with the brightest portion of the object image are performed, and the two focus detection results are compared to obtain a focus detection result satisfying the predetermined condition. Thereafter, final focus detection is executed. For this reason, a focus state of a main object can be reliably detected. In the above operation, an average value may be used in place of the peak value.

FIG. 20 shows a fourth example of an operation flow chart of this embodiment. In this example, the position of a main object is detected using the photometry sensor 16, as has been described in the rear light detection operation (i), and the accumulation control circuit 15 controls a current accumulation time of the AF sensor 11 using an immediately preceding object image signal near the detected main object position.

In step 700, a power supply is turned on, and the flow advances to step 710.

In step 710, the accumulation control circuit 15 selects a block closest to the main object position from the three blocks shown in FIG. 3 on the basis of position information of a main object from the photometry calculation circuit 17, and determines the next accumulation time for an object image signal corresponding to the selected block on the basis of equation 1, so that the peak value has the predetermined value. In this case, since there is no previous object image signal immediately after the power supply is turned on, an initial value of the accumulation time is set.

In step 720, the accumulation control circuit 15 controls charge accumulation of the AF sensor 11 for the set accumulation time.

In step 730, the focus detection calculation circuit 12 processes object image signals read from the AF sensor 11, and calculates a defocus amount of the taking optical system 3.

In step 740, the motor control circuit 13 drives the motor 14 to move the taking optical system 3 to an in-focus position on the basis of the calculated defocus amount. Thereafter, the flow returns to step 710.

In this case, in step 730, the focus detection calculation circuit 12 may always detect a focus state using the entire focus detection area, or may detect a focus area using only an area near a main object.

With the above-mentioned operation, since an object image signal is optimized to have a proper level for a main object portion, an object image signal can have a proper level for a relatively dark main object portion even in a rear light condition.

In the operation in step 710, an average value may be used based on equation 2 in place of the peak value.

The operations in steps 710 and 720 may be modified as follows.

In step 710, the accumulation control circuit 15 selects a block closest to the main object position from the three blocks shown in FIG. 3 on the basis of position information of a main object from the photometry calculation circuit 17, and selects the monitor portion 172, 173, or 174 corresponding to the selected block.

In step 720, the accumulation control circuit 15 controls the accumulation time of the AF sensor 11 using the selected monitor portion.

With this operation as well, an object image signal can have a proper level for a relatively dark main object portion.

In the above device, in a rear light condition, since the accumulation time of the charge accumulation type image sensor is set to be longer than that in a follow light state, a focus state of a low-luminance main object can be detected.

In a rear light condition, since accumulation control is performed for a narrower area of the charge accumulation type image sensor than that in a follow light state, a high-luminance background is ignored, and the level of an object image signal is optimized for a main object. Therefore, a focus state of a low-luminance main object can be detected.

What is claimed is:

1. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a focus detection area set in a frame;

illumination means for illuminating an object in a photographing operation; and detection means for detecting whether or not a current state requires illumination by said illumination means in the photographing operation, wherein when said detection means detects that the current state requires illumination by said illumination means in the photographing operation, said accumulation control means executes accumulation control placing an importance on a low luminance by prolonging the charge accumulation time as compared to a state requiring no illumination by said illumination means.

2. A device according to claim 1, wherein when it is detected that the current state requires illumination by said illumination means in the photographing operation, said accumulation control means executes accumulation control, so that an average value of the object image signal has a predetermined value.

3. A device according to claim 1, further comprising:

photometry means for executing a photometry operation of an area including the focus detection area; and photometry calculation means for calculating an optimal exposure value using an output from said photometry means, and wherein when it is detected that the current state requires illumination by said illumination means in the photographing operation, said accumulation control means executes accumulation control based on the optimal exposure value.

4. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a focus detection area set in a frame;

illumination means for illuminating an object in a photographing operation; and detection means for detecting whether or not a current state requires illumination by said illumination means in the photographing operation, wherein when said detection means detects that the current state requires illumination by said illumination means in the photographing operation, said accumulation control means executes accumulation control, so that a low-luminance portion of the object image signal has an object image signal level suitable for focus detection by said focus detection means.

5. A device according to claim 4, wherein when it is detected that the current state requires illumination by said illumination means in the photographing operation, said accumulation control means executes accumulation control, so that an average value of the object image signal has a predetermined value.

6. A device according to claim 4, further comprising:

photometry means for executing a photometry operation of an area including the focus detection area; and photometry calculation means for calculating an optimal exposure value using an output from said photometry means, and wherein when it is detected that the current state requires illumination by said illumination means in the photographing operation, said accumulation control means executes accumulation control based on the optimal exposure value.

7. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a first focus detection area set in a frame;

illumination means for illuminating an object in a photographing operation; and detection means for detecting whether or not a current state requires illumination by said illumination means in the photographing operation, wherein when said detection means detects that the current state does not require illumination by said illumination means in the photographing operation, said accumulation control means executes accumulation control, so that the object image signal has a level suitable for the focus detection calculation by said focus detection means in the first focus detection area, and when said detection means detects that the current state requires illumination by said illumination means in the photographing operation, said accumulation control means executes accumulation control, so that the object image signal has a level suitable for the focus detection calculation by said focus detection means in a second focus detection area narrower than the first focus detection area.

8. A device according to claim 7, wherein a center of the second focus detection area coincides with a center of the first focus detection area.

9. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for detecting focus states in a plurality of focus detection areas set in a frame by dividing the object image signal into a plurality of blocks, and executing a focus detection calculation for each of the image signals of the divided blocks;

illumination means for illuminating an object in a photographing operation; and detection means for detecting whether or not a current state requires illumination by said illumination means in the photographing operation, wherein when said detection means detects that the current state requires illumination by said illumination means in the photographing operation, said accumulation control means executes accumulation control, so that the object image signal has a level suitable for the focus detection calculation by said focus detection means in a block, where a low-luminance image signal is generated, of the plurality of blocks.

10. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a focus detection area set in a frame;

illumination means for illuminating an object in a photographing operation; and detection means for detecting whether or not a current state requires illumination by said illumination means in the photographing operation, wherein when said detection means detects that the current state requires illumination by said illumination means in the photographing operation, said accumulation control means divides the focus detection area into a plurality of blocks, calculates accumulation times for setting object image signals in the plurality of blocks at proper levels on the basis of the object image signals in the plurality of blocks, and executes accumulation control on the basis of a longest one of the plurality of calculated accumulation times.

11. A focus detection device comprising:

a charge accumulation type image sensor, having a plurality of pixels whose charge accumulation states are simultaneously controlled, for generating an object image signal corresponding to an amount of light received by said plurality of pixels;

a monitor sensor for monitoring the amount of light incident on said charge accumulation type image sensor from the beginning of charge accumulation of said charge accumulation type image sensor, and generating a monitor output;

accumulation control means for comparing the monitor output with a predetermined value to end the charge accumulation of said charge accumulation type image sensor;

focus detection means for executing a focus detection calculation on the basis of the object image signal so as to detect a focus state in a focus detection area set in a frame;

illumination means for illuminating an object in a photographing operation; and detection means for detecting whether or not a current state requires illumination by said illumination means in the photographing operation, wherein when said detection means detects that the current state requires illumination by said illumination means in the photographing operation, said accumulation control means changes the predetermined value, so that a charge accumulation time of said charge accumulation type image sensor is prolonged.

12. A focus detection device comprising:

a charge accumulation type image sensor, having a plurality of pixels whose charge accumulation states are simultaneously controlled, for generating an object image signal corresponding to an amount of light received by said plurality of pixels;

a plurality of monitor sensors for monitoring the amount of light incident on said charge accumulation type image sensor from the beginning of charge accumulation of said charge accumulation type image sensor, and generating monitor outputs;

accumulation control means for comparing the plurality of monitor outputs with a predetermined value to end the charge accumulation of said charge accumulation type image sensor;

focus detection means for executing a focus detection calculation on the basis of the object image signal so as to detect a focus state in a focus detection area set in a frame;

illumination means for illuminating an object in a photographing operation; and detection means for detecting whether or not a current state requires illumination by said illumination means in the photographing operation, wherein when said detection means detects that the current state requires illumination by said illumination means in the photographing operation, said accumulation control means executes accumulation control in accordance with a monitor output indicating a small amount of light from said plurality of monitor sensors.

13. A focus detection device comprising:

a charge accumulation type image sensor, having a plurality of pixels whose charge accumulation states are simultaneously controlled, for generating an object image signal corresponding to an amount of light received by said plurality of pixels;

a plurality of monitor sensors for monitoring the amount of light incident on said charge accumulation type image sensor from the beginning of charge accumulation of said charge accumulation type image sensor, and generating monitor outputs;

accumulation control means for comparing the plurality of monitor outputs with a predetermined value to end the charge accumulation of said charge accumulation type image sensor;

focus detection means for executing a focus detection calculation on the basis of the object image signal so as to detect a focus state in a focus detection area set in a frame;

illumination means for illuminating an object in a photographing operation; and detection means for detecting whether or not a current state requires illumination by said illumination means in the photographing operation, wherein when said detection means detects that the current state requires illumination by said illumination means in the photographing operation, said accumulation control means executes accumulation control using some of said plurality of monitor sensors.

14. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor, so that a level of the object image signal has a first predetermined value;

focus detection means for executing a focus detection calculation on the basis of the object image signal so as to detect a focus state in a focus detection area set in a frame;

illumination means for illuminating an object in a photographing operation; and detection means for detecting whether or not a current state requires illumination by said illumination means in the photographing operation, wherein when said detection means detects that the current state requires illumination by said illumination means in the photographing operation, said accumulation control means controls the charge accumulation time of said charge accumulation type image sensor, so that the level of the object image signal has a second predetermined value smaller than the first predetermined value.

15. A device according to claim 14, wherein the level is a peak value of the object image signal.

16. A device according to claim 14, wherein the level is an average value of the object image signal.

17. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a focus detection area set in a frame;

illumination means for illuminating an object in a photographing operation; and detection means for detecting whether or not a current state requires illumination by said illumination means in the photographing operation, wherein when said detection means detects that the current state requires illumination by said illumination means in the photographing operation, said accumulation control means causes said charge accumulation type image sensor to execute a plurality of number of times of charge accumulations for different charge accumulation times, and when said detection means detects that the current state requires illumination by said illumination means in the photographing operation, said focus detection means detects the focus state on the basis of a plurality of object image signals obtained by the plurality of number of times of charge accumulations of said charge accumulation type image sensor.

18. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a focus detection area set in a frame;

illumination means for illuminating an object in a photographing operation; and detection means for detecting whether or not a current state requires illumination by said illumination means in the photographing operation, wherein when said detection means detects that the current state requires illumination by said illumination means in the photographing operation, said accumulation control means causes said charge accumulation type image sensor to execute a plurality of number of times of charge accumulations based on different charge accumulation control methods, and when said detection means detects that the current state requires illumination by said illumination means in the photographing operation, said focus detection means detects the focus state on the basis of a plurality of object image signals obtained by the plurality of number of times of charge accumulations of said charge accumulation type image sensor.

19. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a focus detection area set in a frame;

illumination means for illuminating an object in a photographing operation; and detection means for detecting whether or not a current state requires illumination by said illumination means in the photographing operation, wherein when said detection means detects that the current state requires illumination by said illumination means in the photographing operation, said accumulation control means causes said charge accumulation type image sensor to execute a charge accumulation placing an importance on a high luminance, and a charge accumulation placing an importance on a low luminance, and when said detection means detects that the current state requires illumination by said illumination means in the photographing operation, said focus detection means detects the focus state on the basis of an object image signal obtained by the charge accumulation placing an importance on a high luminance and an object image signal obtained by the charge accumulation placing an importance on a low luminance by said charge accumulation type image sensor.

20. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a focus detection area set in a frame; and rear light detection means for detecting a rear light condition in which an object is dark, and a background is bright, wherein when said rear light detection means detects the rear light condition, said accumulation control means executes accumulation control placing an importance on a low luminance by prolonging the charge accumulation time as compared to a non-rear light condition.

21. A device according to claim 20, wherein when the rear light condition is detected, said accumulation control means executes accumulation control, so that an average value of the object image signal has a predetermined value.

22. A device according to claim 20, further comprising:

photometry means for executing a photometry operation of an area including the focus detection area; and photometry calculation means for calculating an optimal exposure value using an output from said photometry means, and wherein when the rear light condition is detected, said accumulation control means executes accumulation control based on the optimal exposure value.

23. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a focus detection area set in a frame; and rear light detection means for detecting a rear light condition in which an object is dark, and a background is bright, wherein when said rear light detection means detects the rear light condition, said accumulation control means executes accumulation control, so that a low-luminance portion of the object image signal has an object image signal level suitable for focus detection by said focus detection means.

24. A device according to claim 23, wherein when the rear light condition is detected, said accumulation control means executes accumulation control, so that an average value of the object image signal has a predetermined value.

25. A device according to claim 23, further comprising:

photometry means for executing a photometry operation of an area including the focus detection area; and photometry calculation means for calculating an optimal exposure value using an output from said photometry means, and wherein when the rear light condition is detected, said accumulation control means executes accumulation control based on the optimal exposure value.

26. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a first focus detection area set in a frame; and rear light detection means for detecting a rear light condition in which an object is dark, and a background is bright, wherein when said rear light detection means does not detect the rear light condition, said accumulation control means executes accumulation control, so that the object image signal has a level suitable for the focus detection calculation by said focus detection means in the first focus detection area, and when said rear light detection means detects the rear light condition, said accumulation control means executes accumulation control, so that the object image signal has a level suitable for the focus detection calculation by said focus detection means in a second focus detection area narrower than the first focus detection area.

27. A device according to claim 26, wherein a center of the second focus detection area coincides with a center of the first focus detection area.

28. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for detecting focus states in a plurality of focus detection areas set in a frame by dividing the object image signal into a plurality of blocks, and executing a focus detection calculation for each of the image signals of the divided blocks; and rear light detection means for detecting a rear light condition in which an object is dark, and a background is bright, wherein when said rear light detection means detects the rear light condition, said accumulation control means executes accumulation control, so that the object image signal has a level suitable for the focus detection calculation by said focus detection means in a block, where a low-luminance image signal is generated, of the plurality of blocks.

29. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a focus detection area set in a frame; and rear light detection means for detecting a rear light condition in which an object is dark, and a background is bright, wherein when said rear light detection means detects the rear light condition, said accumulation control means divides the focus detection area into a plurality of blocks, calculates accumulation times for setting object image signals in the plurality of blocks at proper levels on the basis of the object image signals in the plurality of blocks, and executes accumulation control on the basis of a longest one of the plurality of calculated accumulation times.

30. A focus detection device comprising:

a charge accumulation type image sensor, having a plurality of pixels whose charge accumulation states are simultaneously controlled, for generating an object image signal corresponding to an amount of light received by said plurality of pixels;

a monitor sensor for monitoring the amount of light incident on said charge accumulation type image sensor from the beginning of charge accumulation of said charge accumulation type image sensor, and generating a monitor output;

accumulation control means for comparing the monitor output with a predetermined value to end the charge accumulation of said charge accumulation type image sensor;

focus detection means for executing a focus detection calculation on the basis of the object image signal so as to detect a focus state in a focus detection area set in a frame; and rear light detection means for detecting a rear light condition in which an object is dark, and a background is bright, wherein when said rear light detection means detects the rear light condition, said accumulation control means changes the predetermined value, so that a charge accumulation time of said charge accumulation type image sensor is prolonged.

31. A focus detection device comprising:

a charge accumulation type image sensor, having a plurality of pixels whose charge accumulation states are simultaneously controlled, for generating an object image signal corresponding to an amount of light received by said plurality of pixels;

a plurality of monitor sensors for monitoring the amount of light incident on said charge accumulation type image sensor from the beginning of charge accumulation of said charge accumulation type image sensor, and generating monitor outputs;

accumulation control means for comparing the plurality of monitor outputs with a predetermined value to end the charge accumulation of said charge accumulation type image sensor;

focus detection means for executing a focus detection calculation on the basis of the object image signal so as to detect a focus state in a focus detection area set in a frame; and rear light detection means for detecting a rear light condition in which an object is dark, and a background is bright, wherein when said rear light detection means detects the rear light condition, said accumulation control means executes accumulation control in accordance with a monitor output indicating a small amount of light from said plurality of monitor sensors.

32. A focus detection device comprising:

a charge accumulation type image sensor, having a plurality of pixels whose charge accumulation states are simultaneously controlled, for generating an object image signal corresponding to an amount of light received by said plurality of pixels;

a plurality of monitor sensors for monitoring the amount of light incident on said charge accumulation type image sensor from the beginning of charge accumulation of said charge accumulation type image sensor, and generating monitor outputs;

accumulation control means for comparing the plurality of monitor outputs with a predetermined value to end the charge accumulation of said charge accumulation type image sensor;

focus detection means for executing a focus detection calculation on the basis of the object image signal so as to detect a focus state in a focus detection area set in a frame; and rear light detection means for detecting a rear light condition in which an object is dark, and a background is bright, wherein when said rear light detection means detects the rear light condition, said accumulation control means executes accumulation control using some of said plurality of monitor sensors.

33. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor, so that a level of the object image signal has a first predetermined value;

focus detection means for executing a focus detection calculation on the basis of the object image signal so as to detect a focus state in a focus detection area set in a frame; and rear light detection means for detecting a rear light condition in which an object is dark, and a background is bright, wherein when said rear light detection means detects the rear light condition, said accumulation control means controls the charge accumulation time of said charge accumulation type image sensor, so that the level of the object image signal has a second predetermined value smaller than the first predetermined value.

34. A device according to claim 33, wherein the level is a peak value of the object image signal.

35. A device according to claim 33, wherein the level is an average value of the object image signal.

36. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a focus detection area set in a frame; and rear light detection means for detecting a rear light condition in which an object is dark, and a background is bright, wherein when said rear light detection means detects the rear light condition, said accumulation control means causes said charge accumulation type image sensor to execute a plurality of number of times of charge accumulations for different charge accumulation times, and when said rear light detection means detects the rear light condition, said focus detection means detects the focus state on the basis of a plurality of object image signals obtained by the plurality of number of times of charge accumulations of said charge accumulation type image sensor.

37. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a focus detection area set in a frame; and rear light detection means for detecting a rear light condition in which an object is dark, and a background is bright, wherein when said rear light detection means detects the rear light condition, said accumulation control means causes said charge accumulation type image sensor to execute a plurality of number of times of charge accumulations based on different charge accumulation control methods, and when said rear light detection means detects the rear light condition, said focus detection means detects the focus state on the basis of a plurality of object image signals obtained by the plurality of number of times of charge accumulations of said charge accumulation type image sensor.

38. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a focus detection area set in a frame; and rear light detection means for detecting a rear light condition in which an object is dark, and a background is bright, wherein when said rear light detection means detects the rear light condition, said accumulation control means causes said charge accumulation type image sensor to execute a charge accumulation placing an importance on a high luminance, and a charge accumulation placing an importance on a low luminance, and when said rear light detection means detects the rear light condition, said focus detection means detects the focus state on the basis of an object image signal obtained by the charge accumulation placing an importance on a high luminance and an object image signal obtained by the charge accumulation placing an importance on a low luminance by said charge accumulation type image sensor.

39. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a focus detection area set in a frame; and luminance difference detection means for detecting a luminance difference in the focus detection area, wherein when said luminance difference detection means detects that the luminance difference is not less than a predetermined value, said accumulation control means executes accumulation control, so that a low-luminance portion of the object image signal has an object image signal level suitable for focus detection by said focus detection means.

40. A device according to claim 39, further comprising:

photometry means for dividing the frame into a plurality of blocks, and detecting luminance values in the divided blocks, and wherein said luminance difference detection means detects the luminance difference in the focus detection area on the basis of the plurality of luminance values.

41. A device according to claim 39, wherein said luminance difference detection means detects the luminance difference in the focus detection area on the basis of an intensity distribution of the object image signal.

42. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor;

focus detection means for executing a focus detection calculation on the basis of the object image signal so as to detect a focus state in a focus detection area set in a frame; and luminance difference detection means for detecting a luminance difference in the focus detection area, wherein when said luminance difference detection means detects that the luminance difference is not less than a predetermined value, said accumulation control means causes said charge accumulation type image sensor to execute a plurality of number of times of charge accumulations for different charge accumulation times, and when said luminance difference detection means detects that the luminance difference is not less than a predetermined value, said focus detection means detects the focus state on the basis of a plurality of object image signals obtained by the plurality of number of times of charge accumulations of said charge accumulation type image sensor.

43. A device according to claim 42, further comprising:

photometry means for dividing the frame into a plurality of blocks, and detecting luminance values in the divided blocks, and wherein said luminance difference detection means detects the luminance difference in the focus detection area on the basis of the plurality of luminance values.

44. A device according to claim 42, wherein said luminance difference detection means detects the luminance difference in the focus detection area on the basis of an intensity distribution of the object image signal.

45. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor; and focus detection means for executing a focus detection calculation on the basis of the object image signal so as to detect a focus state in a focus detection area set in a frame and for producing a focus signal indicating said focus state;

wherein said accumulation control means causes said charge accumulation type image sensor to execute a plurality of number of times of charge accumulations for different charge accumulation times per one focus signal produced by said focus detection means, and said focus detection means detects the focus state on the basis of a plurality of object image signals obtained by the plurality of number of times of charge accumulations of said charge accumulation type image sensor and produces said focus signal.

46. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor; and focus detection means for executing a focus detection calculation on the basis of the object image signal so as to detect a focus state in a focus detection area set in a frame and for producing a focus signal indicating said focus state;

wherein said accumulation control means causes said charge accumulation type image sensor to execute a plurality of number of times of charge accumulations based on different charge accumulation methods per one focus signal produced by said focus detection means, and said focus detection means detects the focus state on the basis of a plurality of object image signals obtained by the plurality of number of times of charge accumulations of said charge accumulation type image sensor and produces said focus signal.

47. A focus detection device comprising:

a charge accumulation type image sensor, having a plurality of pixels whose charge accumulation states are simultaneously controlled, for generating an object image signal corresponding to an amount of light received by said plurality of pixels;

accumulation control means for controlling a charge accumulation time of said charge accumulation type image sensor; and focus detection means for executing a focus detection calculation on the basis of the object image signal so as to detect a focus state in a focus detection area set in a frame and for producing a focus signal indicating said focus state;

wherein said accumulation control means causes said charge accumulation type image sensor to execute at least two kinds of charge accumulations per one focus signal, one being a charge accumulation which makes a high luminance part of the object image signal proper output level for focus detection of said focus detection means, and the other being a charge accumulation which makes a low luminance part of the object image signal proper output level for focus detection of said focus detection means, and said focus detection means detects the focus state on the basis of an object image signal obtained by the charge accumulation by which the high luminance part of the object image signal becomes proper output level for focus detection and an object image signal obtained by the charge accumulation by which the low luminance part of the object image signal becomes proper output level for focus detection and produces said focus signal.

48. A method of focus detection comprising:

controlling a charge accumulation time of a charge accumulation type image sensor, having a plurality of pixels whose charge accumulation states are simultaneously controlled, for generating an object image signal corresponding to an amount of light received by said plurality of pixels;

executing a focus detection calculation based on the object image signal so as to detect a focus state in a focus detection area set in a frame; and detecting whether or not a current state requires illumination in the photographing operation, wherein when it is detected that the current state requires illumination in the photographing operation, the control of the charge accumulation is executed such that a low-luminance portion of the object image signal has an object image signal level suitable for focus detection.

49. A method of focus detection comprising:

controlling a charge accumulation time of a charge accumulation type image sensor, having a plurality of pixels whose charge accumulation states are simultaneously controlled, for generating an object image signal corresponding to an amount of light received by said plurality of pixels;

executing a focus detection calculation based on the object image signal so as to detect a focus state in a focus detection area set in a frame; and detecting whether or not a current state requires illumination in the photographing operation, wherein when it is detected that the current state requires illumination in the photographing operation, said charge accumulation type image sensor is caused to execute a plurality of number of times of charge accumulations based on different charge accumulation control methods, and when it is detected that the current state requires illumination in the photographing operation, the detection of the focus state is executed based on a plurality of object image signals obtained by the plurality of number of times of charge accumulations of said charge accumulation type image sensor.

50. A method of focus detection comprising:

monitoring the amount of light incident on a charge accumulation type image sensor, having a plurality of pixels whose charge accumulation states are simultaneously controlled, for generating an object image signal corresponding to an amount of light received by said plurality of pixels, from the beginning of charge accumulation of said charge accumulation type image sensor so as to generate a monitor output;

comparing the monitor output with a predetermined value to end the charge accumulation of said charge accumulation type image sensor;

executing a focus detection calculation based on the object image signal so as to detect a focus state in a focus detection area set in a frame; and detecting a rear light condition in which an object is dark and a background is bright, wherein when said rear light condition is detected, said predetermined value is changed, so that a charge accumulation time of said charge accumulation type image sensor is prolonged.

51. A method of focus detection comprising:

controlling a charge accumulation time of a charge accumulation type image sensor, having a plurality of pixels whose charge accumulation states are simultaneously controlled, for generating an object image signal corresponding to an amount of light received by said plurality of pixels;

executing a focus detection calculation based on the object image signal so as to detect a focus state in a focus detection area set in a frame; and detecting a luminance difference in the focus detection area, wherein when it is detected that the luminance difference is not less than a predetermined value, said charge accumulation time is controlled such that a low-luminance portion of the object image signal has an object image signal level suitable for focus detection.

52. A method of focus detection comprising:

controlling a charge accumulation time of a charge accumulation type image sensor, having a plurality of pixels whose charge accumulation states are simultaneously controlled, for generating an object image signal corresponding to an amount of light received by said plurality of pixels;

executing a focus detection calculation based on the object image signal so as to detect a focus state in a focus detection area set in a frame and producing a focus signal indicating said focus state; and wherein said charge accumulation type image sensor is caused to execute a plurality of number of times of charge accumulations for different charge accumulation times per one said focus signal; and the detection of the focus state is executed based on a plurality of object image signals obtained by the plurality of number of times of charge accumulations of said charge accumulation type image sensor and said focus signal is produced.

53. A method of focus detection comprising:

controlling a charge accumulation time of a charge accumulation type image sensor, having a plurality of pixels whose charge accumulation states are simultaneously controlled, for generating an object image signal corresponding to an amount of light received by said plurality of pixels;

executing a focus detection calculation based on the object image signal so as to detect a focus state in a focus detection area set in a frame and producing a focus signal indicating said focus state; and wherein said charge accumulation type image sensor is caused to execute a plurality of number of times of charge accumulations based on different charge accumulation methods per one said focus signal, and the detection of the focus state is executed based on a plurality of object image signals obtained by the plurality of number of times of charge accumulations of said charge accumulation type image sensor and said focus signal is produced.

54. A method of focus detection comprising:

controlling a charge accumulation time of a charge accumulation type image sensor, having a plurality of pixels whose charge accumulation states are simultaneously controlled, for generating an object image signal corresponding to an amount of light received by said plurality of pixels;

executing a focus detection calculation based on the object image signal so as to detect a focus state in a focus detection area set in a frame and producing a focus signal indicating said focus state; and wherein said charge accumulation type image sensor is caused to execute at least two kinds of charge accumulation per one focus signal, one being a charge accumulation which makes a high luminance part of the object image signal proper output level for focus detection, and the other being a charge accumulation which makes a low luminance part of the object image signal proper output level for focus detection, and the detection of the focus state is executed based on an object image signal obtained by the charge accumulation by which the high luminance part of the object image signal becomes proper output level for focus detection and an object image signal obtained by charge accumulation by which the low luminance part of the object image signal becomes proper output level for focus detection, and said focus signal is produced.

55. A camera comprising:

a charge accumulation type image sensor having a plurality of pixels;

an accumulation control device connected with said charge accumulation type image sensor so as to control a charge accumulation time of said charge accumulation type image sensor;

a focus detection device, connected with said charge accumulation type image sensor so as to detect a focus state in a focus detection area set in a frame;

an illumination device; and a detection device which detects whether or not a current state requires illumination by said illumination device in the photographing operation, wherein when said detection device detects that the current state requires illumination by said illumination device in the photographing operation, said accumulation control device executes accumulation control, so that a low-luminance portion of the object image signal has an object image signal level suitable for focus detection by said focus detection device.

56. A camera comprising:

a charge accumulation type image sensor having a plurality of pixels;

an accumulation control circuit connected with said charge accumulation type image sensor so as to control a charge accumulation time of said charge accumulation type image sensor;

a focus detection device connected with said charge accumulation type image sensor so as to detect a focus state in a focus detection area set in a frame;

an illumination device; and a detection device which detects whether or not a current state requires illumination by said illumination device in the photographing operation, wherein when said detection device detects that the current state requires illumination by said illumination device in the photographing operation, said accumulation control device causes said charge accumulation type image sensor to execute a plurality of number of times of charge accumulations based on different charge accumulation control methods, and when said detection device detects that the current state requires illumination by said illumination device in the photographing operation, said focus detection device detects the focus state based on a plurality of object image signals obtained by the plurality of number of times of charge accumulations of said charge accumulation type image sensor.

57. A camera comprising:

a charge accumulation type image sensor having a plurality of pixels;

a monitor sensor;

an accumulation control device which compares the monitor output from said monitor sensor with a predetermined value to end the charge accumulation of said charge accumulation type image sensor;

a focus detection device connected with said charge accumulation type image sensor so as to detect a focus state in a focus detection area set in a frame; and a rear light detection device which detects a rear light condition in which an object is dark, and a background is bright, wherein when said rear light detection device detects the rear light condition, said accumulation control device changes the predetermined value, so that a charge accumulation time of said charge accumulation type image sensor is prolonged.

58. A camera comprising:

a charge accumulation type image sensor having a plurality of pixels;

an accumulation control device connected with said charge accumulation type image sensor so as to control a charge accumulation time of said charge accumulation type image sensor;

a focus detection device connected with said charge accumulation type image sensor so as to detect a focus state in a focus detection area set in a frame; and a luminance difference detection device which detects a luminance difference in the focus detection area, wherein when said luminance difference detection device detects that the luminance difference is not less than a predetermined value, said accumulation control device executes accumulation control, so that a low-luminance portion of the object image signal has an object image signal level suitable for focus detection by said focus detection device.

59. A camera comprising:

a charge accumulation type image sensor having a plurality of pixels;

an accumulation control device connected with said charge accumulation type image sensor so as to control a charge accumulation time of said charge accumulation type image sensor; and a focus detection device connected with said charge accumulation type image sensor so as to detect a focus state in a focus detection area set in a frame, whereby said focus detection device produces a focus signal indicating said focus state;

wherein said accumulation control device causes said charge accumulation type image sensor to execute a plurality of number of times of charge accumulations for different charge accumulation times per one focus signal produced by said focus detection device, and said focus detection device detects the focus state based on a plurality of object image signals obtained by the plurality of number of times of charge accumulations of said charge accumulation type image sensor and produces said focus signal.

60. A camera comprising:

a charge accumulation type image sensor having a plurality of pixels;

an accumulation control device connected with said charge accumulation type image sensor so as to control a charge accumulation time of said charge accumulation type image sensor; and a focus detection device connected with said charge accumulation type image sensor so as to detect a focus state in a focus detection area set in a frame, whereby said focus detection device produces a focus signal indicating said focus state;

wherein said accumulation control device causes said charge accumulation type image sensor to execute a plurality of number of times of charge accumulations based on different charge accumulation methods per one focus signal produced by said focus detection device, and said focus detection device detects the focus state based on a plurality of object image signals obtained by the plurality of number of times of charge accumulations of said charge accumulation type image sensor and produces said focus signal.

61. A camera comprising:

a charge accumulation type image sensor having a plurality of pixels;

an accumulation control device connected with said charge accumulation type image sensor so as to control a charge accumulation time of said charge accumulation type image sensor; and a focus detection device connected with said charge accumulation type image sensor so as to detect a focus state in a focus detection area set in a free, whereby said focus detection device produces a focus signal indicating said focus state;

wherein said accumulation control device causes said charge accumulation type image sensor to execute at least two kinds of charge accumulations per one focus signal, one being a charge accumulation which makes a high luminance part of the object image signal proper output level for focus detection of said focus detection device, and the other being a charge accumulation which makes a low luminance part of the object image signal proper output level for focus detection of said focus detection device, and said focus detection device detects the focus state based on an object image signal obtained by the charge accumulation by which the high luminance part of the object image signal becomes proper output level for focus detection and an object image signal obtained by the charge accumulation by which the low luminance part of the object image signal becomes proper output level for focus detection and produces said focus signal.

\* \* \* \* \*